C12) United States Patent
Frahm et al.

(10) Patent No.: US 10,165,176 B2
(45) Date of Patent: Dec. 25, 2018

(54) METHODS, SYSTEMS, AND COMPUTER READABLE MEDIA FOR LEVERAGING USER GAZE IN USER MONITORING SUBREGION SELECTION SYSTEMS

(71) Applicant: The University of North Carolina at Chapel Hill, Chapel Hill, NC (US)

(72) Inventors: Jan-Michael Frahm, Chapel Hill, NC (US); David Paul Perra, Marina Del Rey, CA (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 197 days.

(21) Appl. No.: 15/031,760

(22) PCT Filed: Oct. 31, 2014

(86) PCT No.: PCT/US2014/063431
§ 371 (c)(1),
(2) Date: Apr. 25, 2016

(87) PCT Pub. No.: WO2015/066475
PCT Pub. Date: May 7, 2015

(65) Prior Publication Data
US 2016/0309081 A1 Oct. 20, 2016

Related U.S. Application Data

(60) Provisional application No. 61/898,406, filed on Oct. 31, 2013.

(51) Int. Cl.
*H04N 5/232* (2006.01)
*G06F 3/01* (2006.01)
(Continued)

(52) U.S. Cl.
CPC ......... *H04N 5/23219* (2013.01); *G06F 3/013* (2013.01); *G06K 9/00604* (2013.01); *G06K 9/2036* (2013.01); *H04N 5/23216* (2013.01)

(58) Field of Classification Search
CPC ............ H04N 5/23219; H04N 5/23216; G06F 3/013; G06K 9/00604; G06K 9/2036
See application file for complete search history.

(56) References Cited

U.S. PATENT DOCUMENTS 3,824,005 A 7/1974 Woestman
5,765,045 A 6/1998 Takagi et al.
(Continued)

FOREIGN PATENT DOCUMENTS

JP 2004254960 A 9/2004
JP 2008005208 A 1/2008

OTHER PUBLICATIONS

Toyama et al., "User Gaze Detection on Arbitrary Objects Using Physical Sensors and an Eye Tracker in a Real Environment," APCHI, Aug. 2012.*
(Continued)

*Primary Examiner* — Thai Q Tran
*Assistant Examiner* — Christopher Braniff
(74) *Attorney, Agent, or Firm* — Jenkins, Wilson, Taylor & Hunt, P.A.

(57) ABSTRACT

A system for leveraging user gaze in a user monitoring subregion selection system includes a first camera configured to capture an image of a scene. A pattern generator is configured to generate and project a pattern onto a surface of at least one of a user's eyes. A sensor is configured to obtain an image of the pattern reflected from at least one of the user's eyes. In an alternate implementation, the pattern generator may be omitted, and the sensor may be a stereo user facing camera. A gaze estimation and scene mapping
(Continued)

ILLUSTRATION OF SYSTEM OUTPUT BASED UPON USER'S GAZE AS INPUT module is configured to estimate a gaze direction of the user using the image captured by the user facing sensor and to map the estimated gaze direction to the image of the scene based on a location of an object of interest within the scene. A subregion selection module is configured to select a subregion of the image of the scene based on the mapped user gaze direction.

37 Claims, 12 Drawing Sheets

(51) Int. Cl.
    *G06K 9/00*           (2006.01)
    *G06K 9/20*           (2006.01)

(56) References Cited

U.S. PATENT DOCUMENTS

| | | | |
|---|---|---|---|
| 7,460,150 B1 | 12/2008 | Coughlan et al. | |
| 7,538,744 B1 | 5/2009 | Liu et al. | |
| 2013/0050258 A1* | 2/2013 | Liu | G02B 27/017 345/633 |
| 2013/0091515 A1* | 4/2013 | Sakata | H04N 17/04 725/10 |
| 2014/0118600 A1* | 5/2014 | Son | H04N 5/23293 348/333.11 |

OTHER PUBLICATIONS

Nakazawa et al., "Point of Gaze Estimation Through Corneal Surface Reflection in an Active Illumination Environment," Computer Vision—ECCV, 2012, pp. 159-172.*
Fraham, "Gaze Controlled Photo Taking System," OTD14-0028, University of North Carolina at Chapel Hill, p. 1-8 (2013).
Google glasses, "Virtual augmented reality," SMI Eye Tracking Glasses p. 1-2 (accessed Jun. 28, 2016).
Jain et al., "Inferring artistic intention in comic art through viewer gaze," ACM Symposium on Applied Perception (SAP) (publication date unknown).
Alnajar et al., "Calibration-free gaze estimation using human gaze patterns," 15th IEEE International Conference on Computer Vision, p. 137-144, (2013).
Li et al., "Learning to predict gaze in egocentric video," International Conference on Computer Vision, ICCV 2013, p. 3216-3223, (2013).
Pfeuffer et al., "Pursuit calibration: Making gaze calibration less tedious and more flexible," Proceedings of the 26th Annual ACM Symposium on User Interface Software and Technology, UIST '13, New York, NY, USA, ACM, p. 261-270, (2013).
Sugano et al., "Appearance-based gaze estimation using visual saliency," IEEE Transaction on Pattern Analysis and Machine Intelligence 35(2), p. 329-341, (2013).
Toyama et al., "Wearable reading assist system: augmented reality document combinng retrieval and eye tracking," Document Analysis and Recognition, (ICDAR), 2013 12th International Conference, p. 30-34, (Aug. 2013).
Twardon et al., "Gaze-contingent audio-visual substitution for the blind and visually impaired," Pervasive Computing Technologies for Healthcare (PervasiveHealth), 2013 7th International Conference, p. 129-136, (May 2013).
Santner et al., "Visual recovery of saliency maps from human attention in 3d environments," Robotics and Automation (ICRA), 2013 IEEE International Conference, p. 4297-4303, (May 2013).
Martinez et al., "Combining first-person and third-person gaze for attention recognition," Automatic Face and Gesture Recognition (FG), 2013 10th IEEE International Conference and Workshops, p. 1-6, (Apr. 2013).
Nakazawa et al., "Point of gaze estimation through corneal surface reflection in an active illumination environment," Fitzgibbon, A., Lazebnik, S., Perona, P., Sato, Y., Schmid, C., eds.: Computer Vision ECCV2012, Lecture Noted in Computer Science, Springer Berlin Heidelberg, p. 159-172, (2012).
Park et al., "3d social saliency from head-mounted cameras," NIPS, 431-439 (2012).
Tsukada et al., "Illumination-free gaze estimation method for first-person vision wearable device," Computer Vision Workshops (ICCV Workshops), 2011 IEEE International Conference, p. 2084-2091, (Nov. 2011).
Lahiri et al., "Design of a gaze-sensitive virtual social interactive system for children with autism," Neural Systems and Rehabilitation Engineering, IEEE Transactions 19(4) p. 443-452, (Aug. 2011).
Lahiri et al., "Dynamic gaze measurement with adaptive response technology in virtual reality based social communication for autism," Virtual Rehabilitation (ICVR), 2011 International Conference, p. 1-8, (Jun. 2011).
Pirri et al., "3d saliency maps," Computer Vision and Pattern Recognition Workshops (CVPRW), 2011 IEEE Computer Society Conference, p. 9-14, (Jun. 2011).
Pirri et al., "A general method for the point of regard estimation in 3d space," Computer Vision and Pattern Recognition (CVPR), 2011 IEEE Conference, p. 921-928, (Jun. 2011).
Hansen et al., "In the eye of the beholder: A survey of models for eyes and gaze," Pattern Analysis and Machine Intelligence, IEEE Transaction of 32(3), p. 478-500, (Mar. 2010).
Park et al., "Wearable augmented reality system using gaze interaction," Mixed and Augmented Reality, 2008, ISMAR 2008, 7th IEEE/ACM International Symposium, p. 175-176, (Sep. 2008).
Villanueva et al., "A novel gaze estimation system with one calibration point," Systems, Man, and Cybernetics, Part B: Cybernetics, IEEE Transactions 38(4), p. 1123-1138, (Aug. 2008).
Kumar et al., "Simple calibration of non-overlapping cameras with a mirror," Computer Vision and Pattern Recognition, 2008, CVPR 2008, IEEE Conference, p. 1-7, (Jun. 2008).
Meyer et al., "A single-camera remote eye tracker," Proceedings of the 2006 International Tutorial and Research Conference on Perception and Interactive Technologies, PIT'06, Berlin, Heidelberg, Springer-Verlag, p. 208-211, (2006).
Guestrin et al., "General theory of remote gaze estimation using the pupil center and corneal reflections," Biomedical Engineering, IEEE Transactions on 53(6), p. 1124-1133, (Jun. 2006).
Wang et al., "Eye gaze estimation from a single image of one eye," Computer Vision, 2003, Proceedings, Ninth IEEE International Conference, vol. 1, p. 136-143, (Oct. 2003).
Como et al., "A cost-effective solution for eye-gaze assistive technology," Multimedia and Expo, 2002, iCME '02, Proceedings 2002 IEEE International Conference, vol. 2, p. 443-436, (2002).
Morimoto et al., "Detecting eye position and gaze from a single camera and 2 light sources," Pattern Recognition, 2002, Proceedings, 16th International Conference, vol. 4, p. 314-317, (2002).
Tan et al., "Appearance-based eye gaze estimation," Applications of Computer Vision, 2002, (WACV 2002), Proceedings Sixth IEEE Workshop, p. 191-195, (2002).
Notification of Transmittal of the International Search Report and the Written Opinion of the International Searching Authority, or the Declaration for International Application No. PCT/US2014/063431 (dated Feb. 5, 2015).

* cited by examiner

METHODS, SYSTEMS, AND COMPUTER READABLE MEDIA FOR LEVERAGING USER GAZE IN USER MONITORING SUBREGION SELECTION SYSTEMS

PRIORITY CLAIM

This application claims the priority benefit of U.S. Provisional Patent Application Ser. No. 61/898,406, filed Oct. 31, 2013, the disclosure of which is incorporated by reference herein in its entirety.

TECHNICAL FIELD

The subject matter described herein relates to improving interaction between users and cameras. More particularly, the subject matter described herein relates to methods, systems, and computer readable media for leveraging user gaze in user monitoring subregion selection systems.

BACKGROUND

Although camera technology has significantly advanced and become more user friendly since its inception, user interaction with a camera has not changed. A user is still required to frame the subject, manually or automatically focus on the subject, and activate the camera to capture the image. All three of these steps distract the user from the user's real world experience. In addition, manual performance of all three of these steps requires photos to be staged and less realistic.

Gaze estimation systems exist. However, there is not known to be such a system that functions efficiently to estimate the gaze direction of the user and automatically and continually map the estimated gaze to scene space based on the location of an object of interest in the scene.

Accordingly, there exists a long felt need for methods, systems, and computer readable media for leveraging user gaze in user monitoring subregion selection systems.

SUMMARY

The subject matter described herein relates to methods, systems, and computer readable media for leveraging user gaze in a user monitoring subregion selection system. One system includes a first camera configured to capture an image of a scene. In one implementation, the system includes a pattern generator configured to generate and project a pattern onto a surface of one of a user's eyes. The system further includes a sensor configured to obtain an image of the pattern reflected from the user's eye. In an alternate implementation, the pattern generator may be omitted, and the sensor may be a user facing stereo camera. The system further includes a gaze estimation and scene mapping module configured to estimate a gaze direction of the user using the image captured by the user facing sensor and to map the estimated gaze direction to the image of the scene based on a location of an object of interest within the scene. The system further includes a subregion selection module configured to select a subregion of the image of the scene based on the mapped user gaze direction.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which:

FIG. 11 (right) is a graph illustrating gaze estimation error using continuous eye device calibration performed at run time. The error spike in FIG. 11 (right) was due to a pupil occlusion by the eyelashes; FIG. 12 (right) is an error plot for experiment three's frame sequence and a sample user image from a third data set.

DETAILED DESCRIPTION

Figure 1:
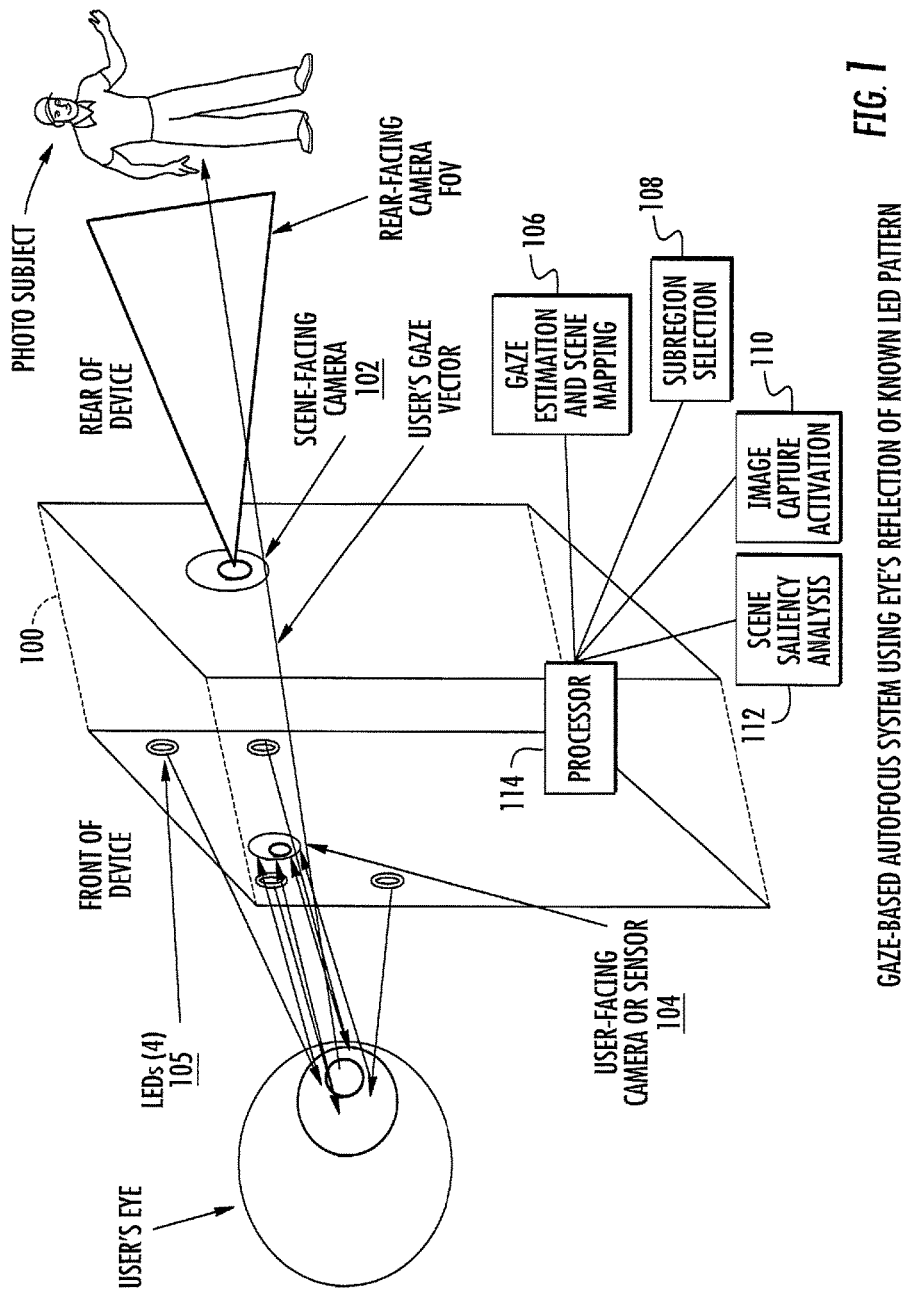
FIG. 1 is a diagram of a system for leveraging user gaze in a user monitoring subregion selection system according to an embodiment of the subject matter described herein.

Cameras have come a long way since their inception. Over the years, cameras have become so incredibly compact, high-resolution, low-noise, energy efficient, and inexpensive that they have become a staple in the sensor world. Although the aforementioned are all positive traits of the camera, they have done nothing but support the primary reason why cameras have pervaded our modern-day culture: it is the ease and usefulness of the camera which makes it so desirable; it allows the masses to permanently capture any moment in time on a whim. This functionality fulfills a person's desire to cherish and reminisce about their past experiences and, now that we have such a tool, is now practically inseparable from the way that we live our lives.

Despite the advances in camera technology, surprisingly little has been done towards improving the interaction between humans and cameras. Regardless of the camera platform, whether it be a high-end SLR or an inexpensive cell phone camera, the user typically has to go through the same steps to take a photo: 1) use a viewfinder or a screen to put the subject in the frame, 2) continue using the viewfinder or screen to manually or automatically focus on the subject, and 3) command the camera to take the photo. Unfortunately, all of this explicit interaction with the camera distracts the photographer from experiencing what's actually going on in the scene—she must, unfortunately, sacrifice her firsthand enjoyment of the situation so that she can have a second-hand memory of it. Moreover, this problem becomes even more relevant for devices like with head mounted cameras (augmented reality glasses, for example) which create a need for breaking the traditional viewfinder-based photo taking. This highlights the exact problem that the subject matter described herein solves: how can we make cameras smarter so that little to no user interaction is required to take a great photo? Ideally, we would like photos to be a memory of what the photographer actually experienced—not just a captured 2D memory (if no 3D information is captured) of what they should have experienced.

With all of this said, the question still stands: how do we plan to reduce interaction with a camera? It is clear that the 2nd step of the photo-taking process is the most distracting to the user. Coincidentally, it is also the most challenging step to solve. As such, let's first discuss the difficulties in the 1st and the 3rd steps.

Currently, when a user tries to get their subject into the frame, they commit their attention to interacting with the camera. However, as modern cameras become higher resolution and start supporting wider angle shots, framing the subject becomes significantly less difficult because more of the scene is captured with each photo; under this assumption, pointing the camera in the general direction of the subject yields a high probability that the subject is contained within the photo. While the composure of the photo may not be perfect, the content is still there, allowing the user to recompose the image in post-processing steps (or opening the doors to recomposure via automatic cropping methods potentially using our proposed data about the user's gaze). Ultimately, we believe that framing the subject without looking at the camera will become less of a problem as technology moves forward.

Fortunately for us, the 3rd step of the photo-taking process (commanding the camera to actually take the photo) is becoming less of an issue, too. With the advent of accurate voice recognition and other gesture detection techniques (for example wink based control), clicking the shutter-release button may soon be a thing of the past. We believe that replacing the shutter-release button is a trivial issue, which can be solved sufficiently well with currently existing techniques.

Now, with the other details out of the way, we can move on to the second step of the photo-taking process: having the camera automatically determine the subject to focus on without significant explicit user input. It's important to realize that a lack of explicit user input does not imply a lack of user-supplied information about a scene—the camera just needs to be adapted to observe the user and watch for clues about where to focus. We believe that the best way of solving this problem is by augmenting currently existing autofocus algorithms and zoom/cropping mechanisms with gaze detection and pose estimation techniques. One aspect of the subject matter described herein uses a user-facing camera or other measurement device, such as a depth sensor, to measure the user's face/body (in the capturing cameras coordinate system) and for determining the 3 dimensional ray or cone of vision, which describes the user's current gaze direction and its relation to the user facing camera. Then, the user facing camera would be capable of detecting the region of the scene (for example through evaluating visual saliency or object of interest detection using machine vision methods), which should be focused upon. If the camera has some estimate of its current (partial) pose (using integrated sensors like inertial measurement units (IMU) or GPS) with respect to the user's head and/or the scene, then the estimate can be further improved or directly obtain through the sensor measurements.

In general, in the setup that we describe above, the user's gaze direction can be transformed or can be computed directly in the photo taking camera's coordinate system. It defines a ray in that coordinate system which can then be projected onto the photo taking camera's image plane. The projected ray defines a line in the image plane of the photo taking camera. This line can then be used to determine the user's object of interest (part of the scene of interest) along the projected line. The projection allows the search to be limited to a subspace of the image (often 1D plus some uncertainty region or neighborhood as required by the machine vision or object of interest detection).

Such a system may require sensitivity to a user's gaze and an accurate representation of its own pose with respect to the user in order to properly focus (world coordinate pose is not required as the camera always can define its own coordinate system). In addition, the user-facing camera may require that the user's face be in sight for this to work (this may indicate that a movement towards wide-angle user facing cameras and/or similar high resolution sensors that can be cropped appropriately could be useful) or exploit multiple cameras to overcome this problem or depth cameras with an appropriate field of view. Alternatively, a physical constraining apparatus could be used to ensure a proper camera placement.

However, the successful execution of such a system would allow for the total immersion of a user into their surroundings; users would no longer be consciously burdened with operating their camera—instead, they would only be concerned with telling/signaling the camera to take a picture, assuming that the rest was already taken care of. Cameras would finally be capable of capturing what the photographer is actually experiencing, instead of being a clunky obstacle which hampers the photographer's enjoyment and experience of a scene.

This system can be implemented on a smartphone as a majority of today's smartphones have both forward and user facing cameras as well as an IMU. While the proposed work sounds exciting when applied to smartphones, it becomes even more exciting when one considers the significance that it could have in augmented and virtual reality applications. If a head-mounted display were able to perform a similar type of gaze tracking through user facing cameras or other user/eye tracking mechanism then a plethora of new features become feasible, bringing head-mounted displays one step closer to providing total immersion to the user. While targeting the former devices, the invention can also be applied to standard cameras (for example point and shoot, SLR and video cameras) if they incorporate appropriate user facing cameras or other user sensing modalities.

Exemplary Contributions:
  Referential gaze detection for usage in hands-free autofocus/subregion selection systems
  A human-camera interaction system which opens the doors to gaze-specific metadata, useful in post-processing, such as automatic image composure based on the part of the scene that the user was looking at when the photo was taken.

Additional Notes:
  When trying to determine a freestanding device's 6D pose with respect to the user's gaze direction, a number of different approaches can be taken. Two possible approaches are:
    The device can power an array of LEDs, which can be tracked in the eye's reflection; these "glints", as they are called, can be used to determine the device's relative pose with respect to the eye's pose since we know the configuration of the LEDs in 3d space. These LEDs need not have outputs in the visible light spectrum. The LEDs can be either emitting visible or invisible lights.
    Alternatively, a (bright) pattern can be displayed upon the device's screen; that pattern can replace the LEDs while accomplishing the same goal.
  The number of LEDs or patterns on the screen can be varied based on the robustness and minimal number of points required for the specific pose estimation problem (could be lower for constraint glasses setups or physical apparatus to mount cameras then required in the general case). It should be noted that if this system is used for a head-mounted display or other wearable computing device, it is quite likely that only two LED's are necessary or even one if properly places and exploited for constraint pose estimation. If a stereo camera or multi-camera system is used in place of the user facing camera, then no glints need to be produced in the user's eye(s).
  Because the LEDs in our system will have a fixed size, baseline, and brightness, it seems possible that we could dynamically determine the distance between the user's eyes and the device. This could be helpful when finding the exact position of the imaged scene that the user is looking at.
  A model of the eye can be used for pose estimation if desired. We plan on prototyping leveraging a model which is based, partly or in full, upon the Gullstrand eye model. The Gullstrand eye model keeps things simple yet accurate. Other eye models can similarly be leveraged to support the task.

FIG. 1 depicts a gaze driven subregion selection system for a device with a user-facing camera, a scene-facing camera, and a series of user-facing LEDs. The light that is output from the LEDs is reflected off of the user's eye and is imaged by a user-facing camera. The LED reflections help the device to determine its relative pose with respect to the user's eye, and also helps to determine the user's gaze direction. With all of this data, the user-facing camera can determine where to focus in the scene.

In FIG. 1, the system includes a housing 100 that houses a scene facing camera 102 and a user facing sensor or camera 104. In one embodiment, housing 100, scene facing camera 102, and user facing camera or sensor 104 may be components of a handheld device, such as a mobile phone, a point and shoot camera, an SLR camera, a handheld or tablet computer, and/or video camera. In the illustrated example, scene facing camera 102 comprises the user facing camera of a device, such as a mobile phone, and user facing camera or sensor 104 comprises the scene facing camera of the mobile phone.

To facilitate gaze estimation, the system includes a pattern generator 105 that projects a pattern onto a surface of at least one of the user's eyes, which is detected by a user facing camera or sensor 104. In FIG. 1, pattern generator 105 comprises an array of LEDs spaced about the user facing surface of housing 100.

The system also includes a user gaze estimation and scene mapping module 106 for estimating a gaze direction of the user and for mapping the estimated gaze direction to the image of the scene captured by camera 102 based on a location of an object of interest within the scene. The system further includes a scene subregion selection module 108 for selecting a portion of the image of the scene captured by scene facing camera 102 on a portion of the scene based on the mapped user gaze direction. The system illustrated in FIG. 1 may also include an image capture activation module 110 for activating image capture of scene facing camera 102 based on a gesture or command of the user. For example, image capture activation module 110 may initiate image capture in response to a spoken command of the user or a gesture, such as a hand gesture of the user.

In one embodiment, the spoken command may automatically invoke gaze estimation, auto focus or subregion selection, and image capture, regardless of whether the camera function or application of the device is currently running and regardless of whether the device is locked by a security screen. Thus, using a spoken command or gesture known only to the user and those whom the user trusts, all of the steps for image capture can be invoked, resulting in an increased likelihood of capturing a desired image.

The system illustrated in FIG. 1 may further include a scene saliency identification module 112 for identifying a salient portion of the scene based on the user's gaze. Scene saliency identification module 112 may identify a visually salient portion of the image and may predict the activity in which the user is currently participating based on the scene. Examples of scene saliency and prediction of user activities will be provided below.

Each of modules 106, 108, 110, and 112 may be executed by a processor 114. Processor 114 may be a microprocessor that executes or implements modules 106, 108, 110, and 112 using hardware, software, and/or firmware. When configured with or implementing modules 106, 108, 110, and 112, processor 114 becomes a special purpose computer that improves the technological field of image capture by reducing the amount of user interaction with an image capture device for the device to capture an image.

Even though the embodiment illustrated in FIG. 1 uses the user facing camera of a device to capture the image of a scene and the photo taking camera of the device to capture the image for gaze and relative pose estimation, the subject matter described herein is not limited to such an embodiment. For example, the roles of the scene and user facing cameras of the device may be reversed, provided there is a mechanism projecting trackable patterns on the user's eye(s) for gaze estimation purposes located on the rear of the device (if such capabilities are required by the chosen gaze tracking implementation). In addition, the device used to capture the image of the trackable pattern reflected from the user's eye need not be a camera, but can instead be a photodiode array or other device capable of tracking the location of a reflected pattern.

Figure 2:
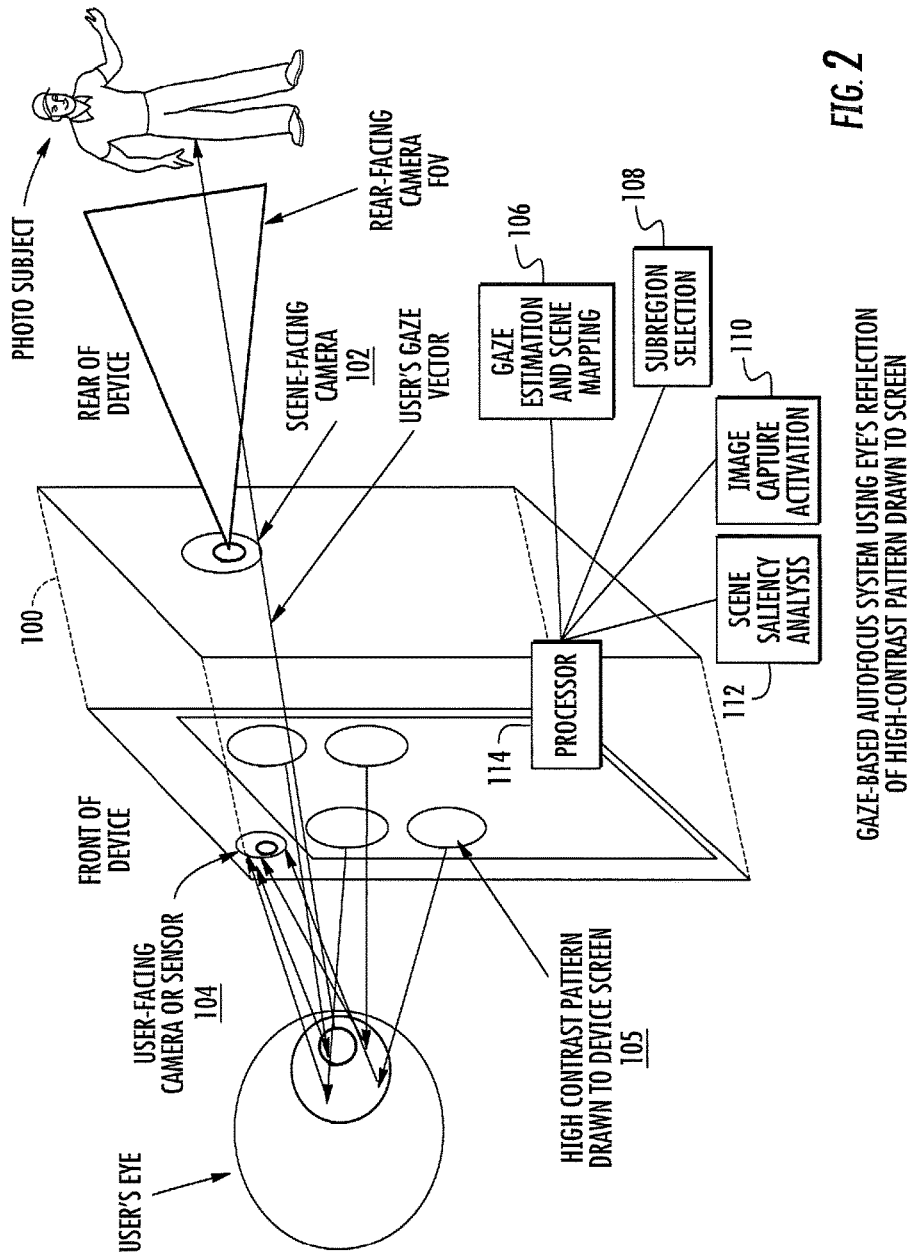
FIG. 2 is a diagram illustrating a system for leveraging user gaze in a user monitoring subregion selection system according to another embodiment of the subject matter described herein.

FIG. 2 depicts a similar system as Illustration 1 but, instead of LEDs, it uses draws a known high-contrast pattern to a screen which faces the user. This pattern's reflection in the eye can then be imaged by the user-facing camera to determine pose and gaze direction. For example, in FIG. 2, pattern generator 105 comprises a display screen, such as an existing LCD or LED screen of a mobile phone, camera, or computer.

Figure 3:
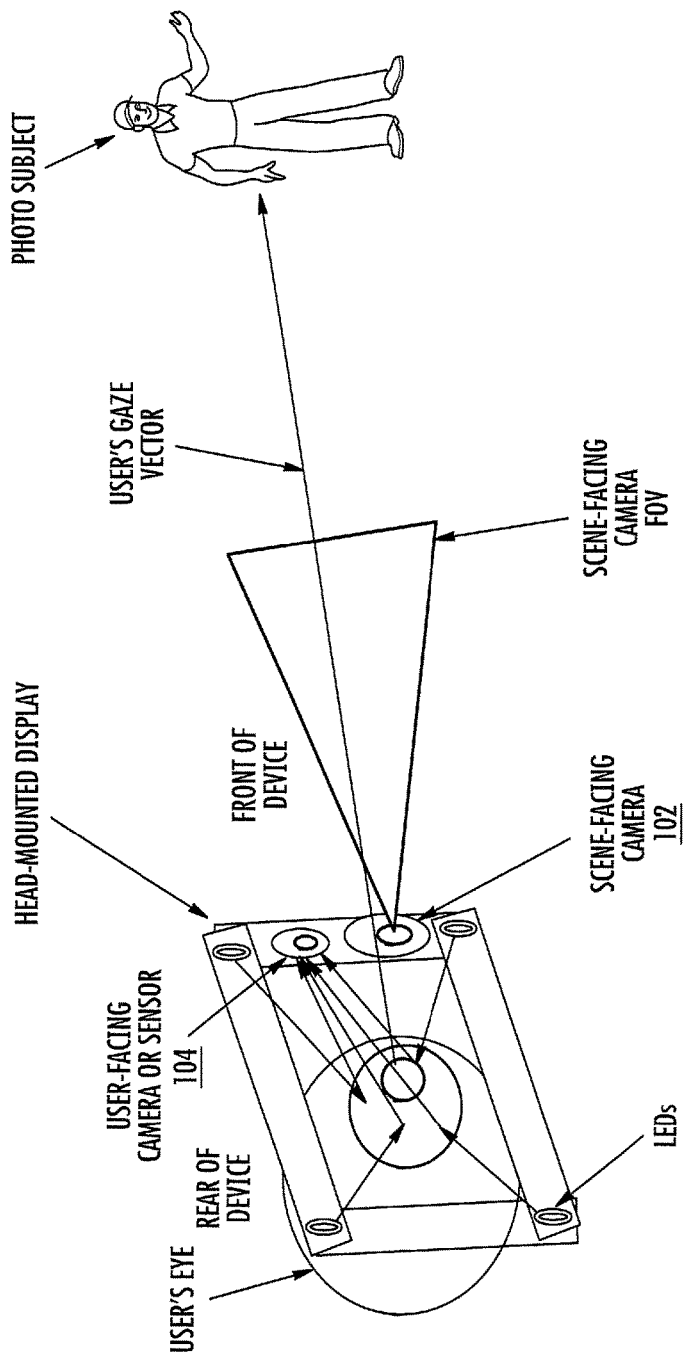
FIG. 3 is a diagram illustrating a system for leveraging user gaze in a user monitoring subregion selection system according to yet another embodiment of the subject matter described herein.

FIG. 3 depicts a very similar system to FIG. 1, with the only exception being that the user-facing LEDs are embedded into a head-mounted display or other wearable computing device. For example, the components illustrated in FIG. 1 or 2 can be part of an eyeglass mounted computing system, such as Google Glass®.

Figure 4:
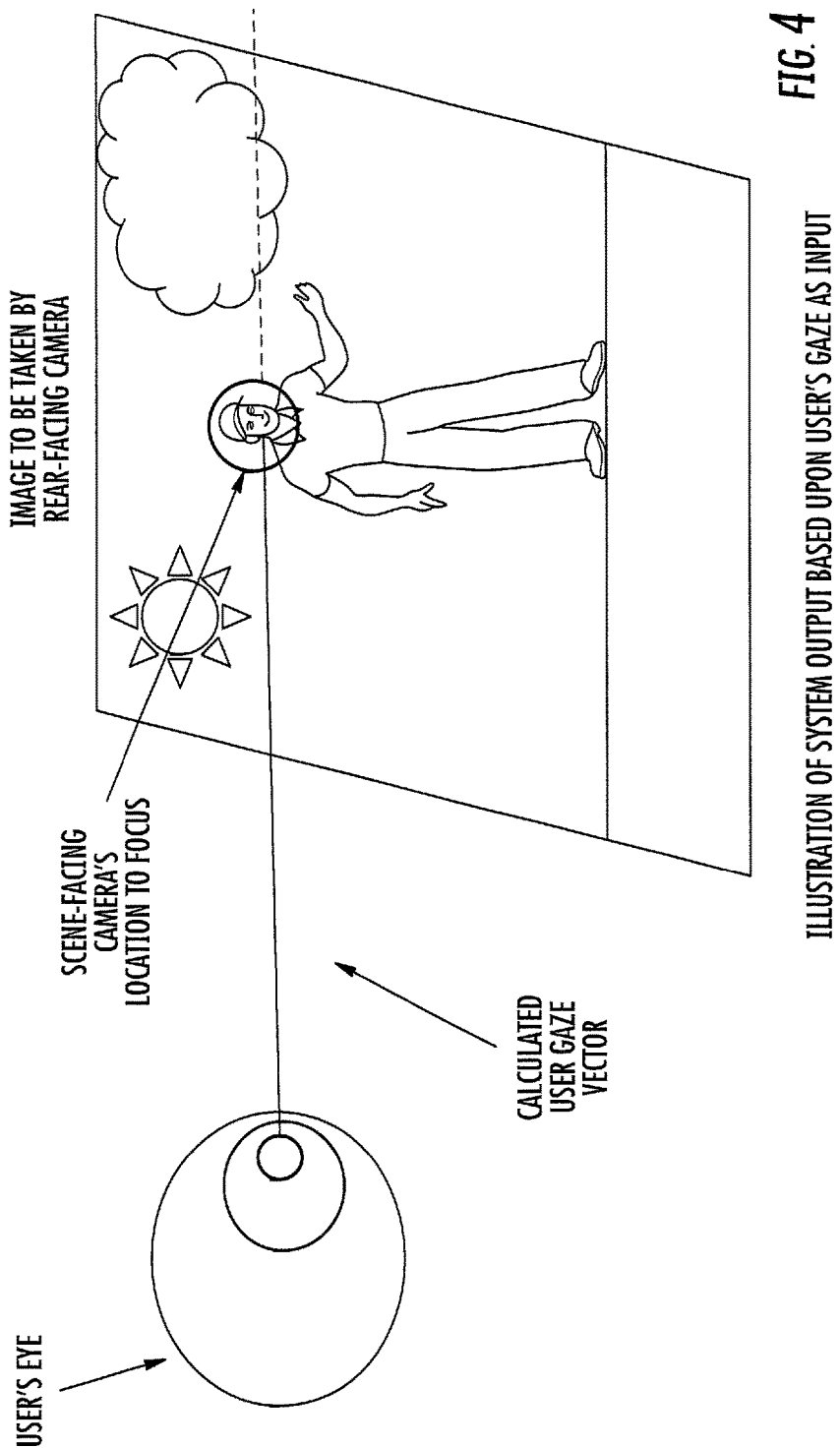
FIG. 4 is a diagram illustrating output of a subregion selection module based on user gaze direction as input according to an embodiment of the subject matter described herein.

FIG. 4 shows an example input (a user looking at a scene) and the example output (automatically autofocusing on a part of the image that the user-facing camera sees based on what the user is actually looking at). For example, in FIG. 4, a gaze vector calculated by gaze estimation module 106 passes through a portion of the scene. The intersection of the gaze vector with the scene is used by subregion selection module 108 to determine the portion of the scene on which the scene facing camera should be focused. A saliency analysis maybe performed to identify the object in the scene that is closest to the intersection of the gaze vector with the scene. In the illustrated example, the gaze vector intersects with a person's head. However if the gaze vector had not intersected exactly with the person's head, the saliency analysis maybe used to identify the person's head as the closest object to the intersection with the gaze vector and the scene facing camera may be focused on that object.

Figure 5:
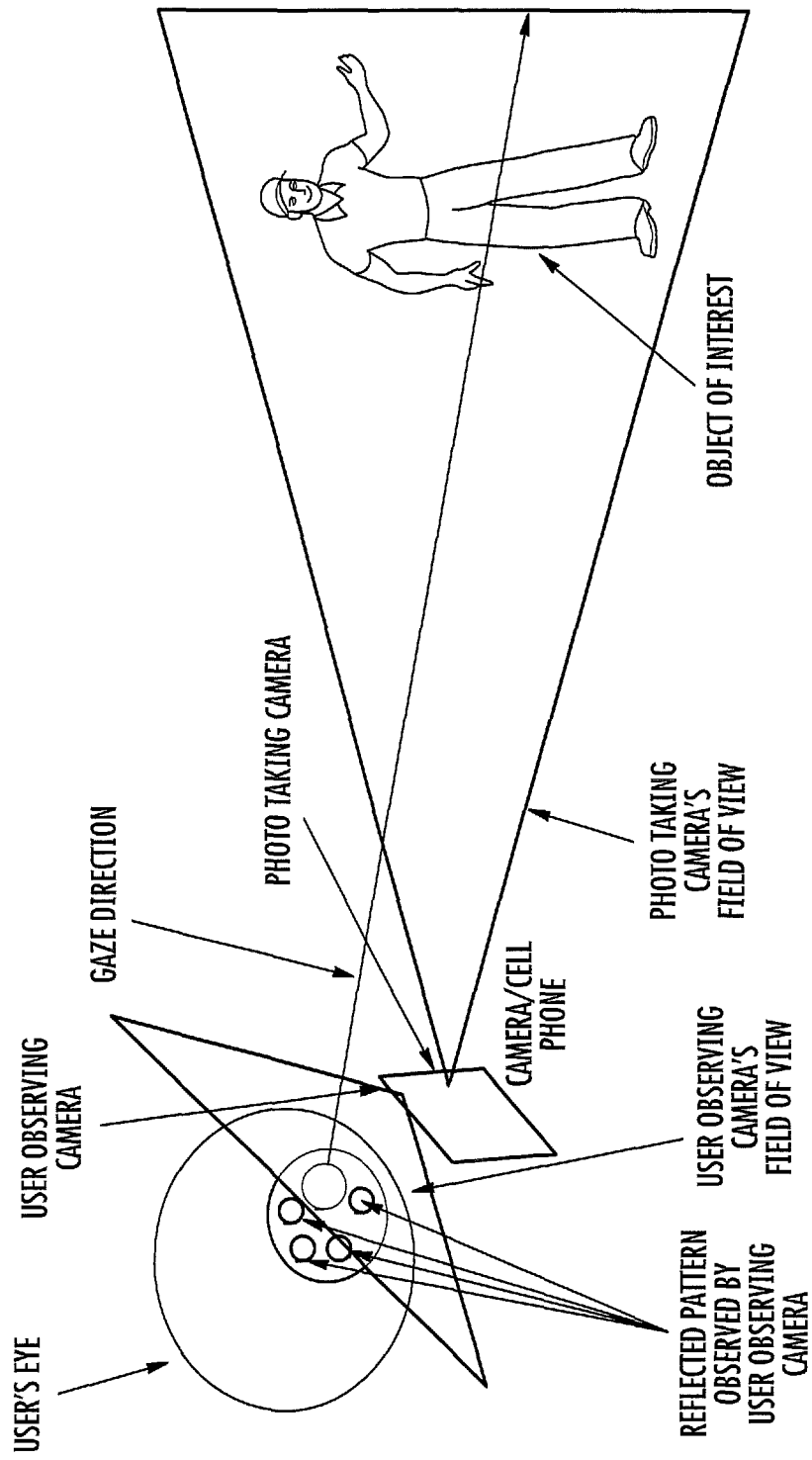
FIG. 5 is a diagram illustrating an image capture scenario where the system is implemented as part of a mobile phone according to an embodiment of the subject matter described herein.

FIG. 5 shows a schematic drawing of the capture scenario for a mobile phone. In FIG. 5, a camera or cell phone frames an object of interest in an image. The pattern generator projects a pattern onto a surface of the user's eye and the user facing camera of the camera or cell phone detects the reflected pattern. The gaze of the user is determined and quantified as a gaze vector. The intersection of the gaze vector and the image is determined. The gaze vector may then be corrected based on the location of an object of interest in the scene.

Figure 6:
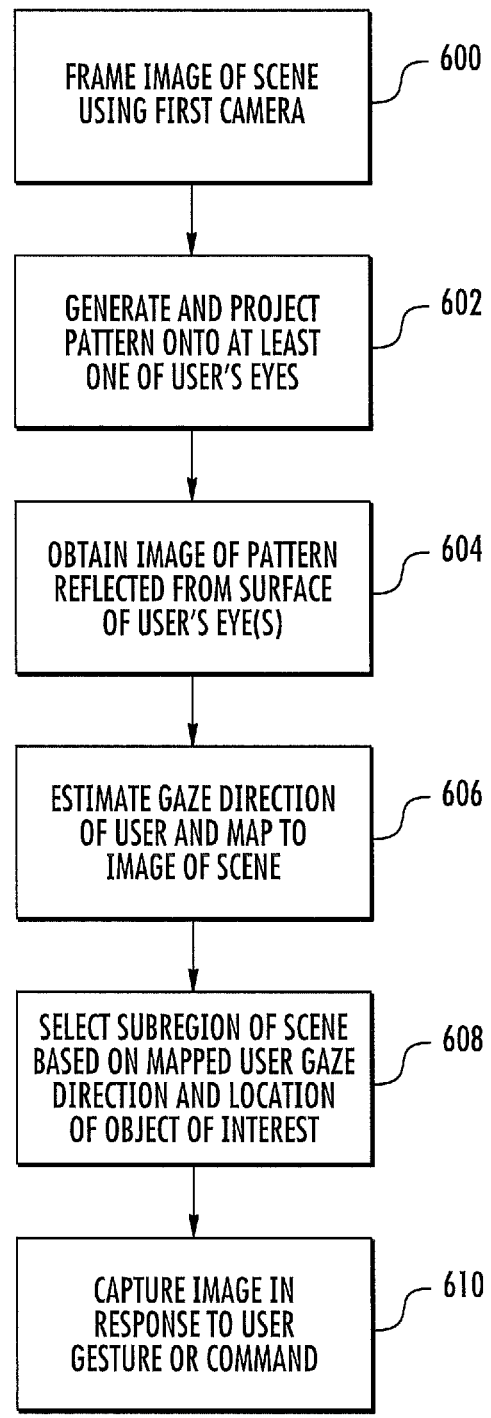
FIG. 6 is a flow chart illustrating an exemplary process for leveraging user gaze in a user monitoring subregion selection system according to an embodiment of the subject matter described herein.

FIG. 6 is a flow chart illustrating an exemplary process for leveraging user gaze in a user monitoring subregion selection system according to an embodiment of the subject matter described herein. Referring to FIG. 6, in step 600, an image of the scene is framed using a first camera. For example, an image may be framed in the field of view of scene facing camera 102. In step 602, a pattern is generated and projected onto a surface of at least one of a user's eyes. For example, LEDs arranged in or on a user facing surface of a device or a display on a user facing surface of a device may generate and project the pattern. In step 604, an image of the pattern reflected from a surface of at least one of the user's eyes is obtained. For example, the image of the pattern may be obtained using a second camera or other sensor facing the user. In step 606, the gaze direction of the user is determined and mapped to the image of the scene. For example, as will be described in more detail below, the user's gaze direction may be estimated using a model of the user's eye and the detected patterns to determine a visual axis. That visual axis is then mapped to the coordinate system of the user facing camera and projected onto the scene facing camera's image plane. The intersection of the visual axis with the image plane is then corrected or calibrated based on a location of an object of interest within the scene. The calibration may be repeated continually over different windows of image frames. In step 608, a subregion of the image is selected based on the mapped gaze direction. Selecting a subregion of the scene may include selecting a predetermined amount of pixels around the intersection of the mapped visual axis with the scene and displaying that the intersection to the user. For example, if the user is looking at a person's face, the selected region may be the person's face and a number of pixels surrounding the person's face where the number of pixels can be determined by the resolution of the image capture sensor. In step 610, an image of the scene is captured. Capturing the image of the scene may include digitizing and storing the subregion selected in step 608. The capturing may be performed continually in the case of video photography. The capturing may be initiated through user activation of a button on the camera, by a spoken command, or in response to a user gesture, including gazing into scene.

Our system, as described above, is very useful for photography, but its usefulness extends far beyond just casually taking photos. We can analyze a scene's saliency with our photo-taking (world facing) camera and, by using the gaze detection part of the system, identify exactly what part of the scene that the user is looking at. This could be useful in predicting what a user is currently doing or is interested in. There are many examples of why this might be useful; devices could have more fine-grained control over the user's experience if it could, for example, detect when a user is driving a car, or when they're interacting with friends, or when they're conducting business. However, such a system could also be useful for data mining. Advertisers could monitor when users view their advertisements, and companies could determine when a user is utilizing their product. The device could learn what the user typically looks at and somehow leverage that data. Some eye trackers may already be trying to do this on a computer screen. However, our system is general enough to perform this task in any 3D environment, imposing no restrictions on where the user can look or move. This is a significant improvement over current systems which limit user gaze to a small, rectangular, fully controlled and calibrated screen.

Tracking both eyes simultaneously is not required but is still worthwhile. Tracking both eyes will yield two separate viewing rays in 3d space. The intersection of these two rays provides our system with enough information to identify the exact 3D point in space that the user is fixated upon. Having this functionality could potentially remove the need for any saliency analysis of the scene that the user is looking at. In addition, this setup could provide a very simple and intuitive way to perform accurate auto-focusing in systems which have stereo cameras (the stereo camera would simply need to focus in a similar fashion to the user's eyes). Overall, this setup will allow for more fine-tuned control of the cameras, improve the accuracy of the autofocus location or subregion selection, and provide additional metadata which can be stored with the resulting image and used at a later time.

In addition to the above, using two cameras to observe a single eye would provide enough information to the system that LEDs would no longer be required. Such a setup has already been proven to provide results which are accurate to approximately 1 degree. Supplementing this setup with LEDs will simply improve the accuracy of the results, infrared (IR) LEDs, for example, can be used to simultaneously illuminate the eye and provide a glint which can be used for further refinement of gaze direction).

During the detection of glints on the user's eye, spurious reflections caused by light sources other than the known LED pattern are sometimes detected. These spurious reflections can lie on both of the user's eyes and/or the eyes' surrounding moist tissues. Unless the user is in a relatively dim room with only ambient lighting, these spurious reflections need to be eliminated in order to accurately estimate the user's corneal center and pupil center. We believe that a couple of different techniques could successfully solve this problem:

1) Flashing or strobing the known glint pattern can allow for a user facing camera to image the eye over multiple frames, using difference images to properly locate the glints of the eye.
2) Using a recognition process, we could learn what the glint pattern looks like on the eye and eliminate spurious reflections from both the eye and its surrounding moist tissues.

One product that tracks user gaze is described at:
http://www.eyetracking-glasses.com/studies/gaze_interaction/
This system works by detecting the gaze in both eyes using a known infrared LED pattern. The device then triangulates the two gaze vectors to a point on an image which is captured by a scene facing camera. In at least one use case of the device a recognition engine is leveraged to identify exactly what the user is looking at.

One difference between our proposal and this product is that our technique can work using a single eye, while this product needs to track both eyes to properly determine that object of interest. By tracking both eyes, the product at the URL described above can, with high confidence, pinpoint the object that the user is looking at. On the other hand, our proposed technique can be successful despite tracking only one eye with the consequence being that, in order to identify the exact point of a scene that a user is looking at, a ray of potential viewing points needs to be searched within the image. Added novelty stems from the saliency/recognition algorithm that we use to determine which object along that ray is actually being viewed by the user as well as the interaction for photo taking through a variety of mechanisms and the optional post processing. By avoiding the need to track both eyes, our system is less obtrusive to the user and, thus, makes it a prime candidate for use in lightweight wearable computing devices (such as heads up displays).

In addition, the product at the above-listed URL operates using a scene facing camera that has a very large depth of field; this makes focusing on the scene a non-issue. Our system is flexible enough to work with a scene facing camera that has a shallow depth of field to ensure that various photographic techniques are still employable.

In the examples described above, a pattern generator and a sensor are used to project a pattern, detect the pattern, and the detected pattern is used to estimate the user's gaze direction. In an alternate embodiment, the pattern generator may be eliminated, and the sensor may be a user facing stereo camera that is capable of tracking one or both eyes of a user using stereo images reflected from the user's eye(s). The stereo images obtained by the sensor may be used to estimate the gaze direction of the user.

It should be noted that spurious reflections are significantly less likely to occur in the product described at the URL referenced above since the frame of the glasses is thick and wraps around the entire eye, shielding it from most external light sources (aside from the LED pattern, of course). Since our proposed device makes no assumptions on where it will be mounted with respect to the user, eliminating spurious reflections plays a key role in our algorithm's success in extracting the user's gaze direction.

In the examples above, a gesture or spoken command is used to initiate image capture. In an alternate embodiment, any predetermined signal could be used to initiate image capture. For example, brain sensors can be used to generate the signal that initiates image capture. In emergency situations, a sensor that senses increased heart rate may trigger image capture. The latter could be interesting with respect to patient monitoring for doctors to see what happened in the last 5 min before (assuming the system keeps the last 5 min around) the fall of the patient or the start of an acute problem. The same signals may be used for saving data while you drive and in case of an accident, your glasses store the video of what happened (could be very useful). Instead of sensors also the glasses could recognize through computer vision that the video should potentially be stored It will be understood that various details of the presently disclosed subject matter may be changed without departing from the scope of the presently disclosed subject matter. Furthermore, the foregoing description is for the purpose of illustration only, and not for the purpose of limitation.

Eye Camera Calibration for Head Word Devices

1 Introduction

Figure 7:
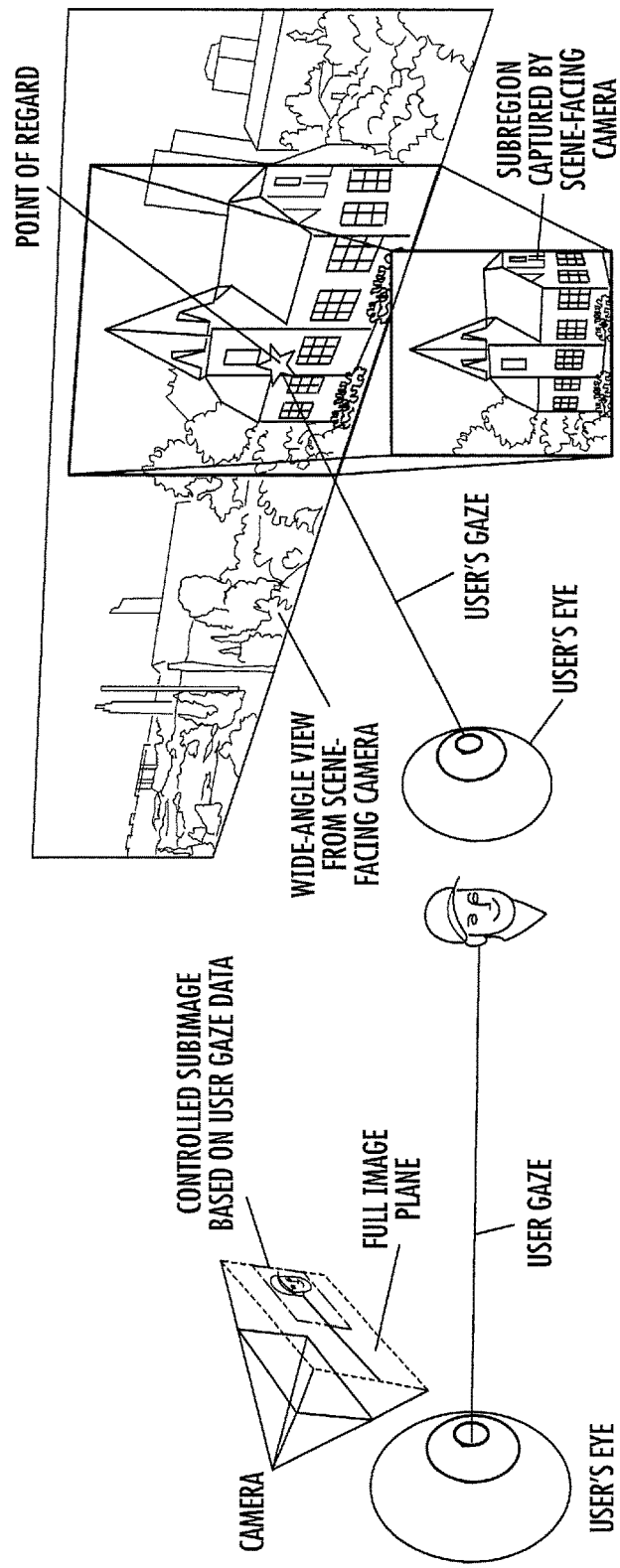
FIG. 7 is a diagram of a photography scenario in which the captured image's focal point is controlled by the user's gaze according to an embodiment of the subject matter described herein.

We are now at the verge of ubiquitously available consumer-grade head-wearable devices, with Google Glass® serving as an early example. These devices enable new ways of capturing our environment but also present challenges for meaningful interaction with the device. Currently, the most dominant mode of interaction with head-worn devices is voice control, which allows for the triggering of preset tasks. However, this form of control is tedious for applications such as photography (for example, taking a controlled snapshot of a scene by zooming in on only a particular part of the scene; see FIG. 7 for an example of a controlled photo). A natural alternative in controlling the camera's viewpoint is to allow the user's gaze to control the photo-taking process. This becomes especially interesting now that there are cameras available which allow full digital zoom at the native sensor resolution by only selecting a part of the sensor for the photo; such a camera is already found onboard the Nokia Lumia 1020. For these devices, it is critical to select the correct sensor region based upon the user's gaze at the time of capture. We propose a gaze tracking system for head-worn devices using a user-facing camera to extract the user's gaze direction. Besides our mentioned novel photo taking application, the proposed system can generally be used to determine the user's attention by estimating their 3-D point of regard (PoR) in the environment. User attention can be related to the PoR, which can then be used for photography, safety notifications, analysis and support of the user's social interaction, and other aids to the human visual system. Our PoR estimation technique is especially useful to a number of emerging research fields, including those focused upon human behavior and social interaction; these fields are forced to choose between overly cumbersome gaze tracking hardware (which may affect the subjects' behaviors or iteractions) or attempting gaze estimation from face pose alone, losing out on gaze subtleties from eye-only gaze adjustments [1], [2].

User gaze information is undoubtedly useful to control head-worn devices but it is detrimental to the user experience when it is inaccurate. Calibration between the device and the user's eye is a critical but significant challenge. Take, for example, devices which assume a glasses-type form factor: the pose of the device varies as it moves along the bridge of the user's nose, causing the transformation between the user's gaze and the device to also change. This transformation is subject to change both while wearing the device and after taking it off and putting it back on. Parameters of the eye which are used for gaze estimation also vary on a user to user basis. Thus, for gaze estimation to remain accurate at all times, it is necessary to constantly update the transformation between the device and the user. To address this challenge we propose a novel calibration scheme for the head-worn device to allow accurate gaze tracking even with a simple head-worn system. The proposed calibration scheme leverages naturally occurring regions of interest instead of traditional calibration markers in order to generalize to arbitrary scenes. The proposed calibration can be continuously performed during normal use of the head-worn device as it does not require any active user participation. Our calibration can be continuously performed over a window of recent frames in order to provide a highly accurate, locally optimal model for the current eye-device transformation.

2 System Overview

Figure 8:
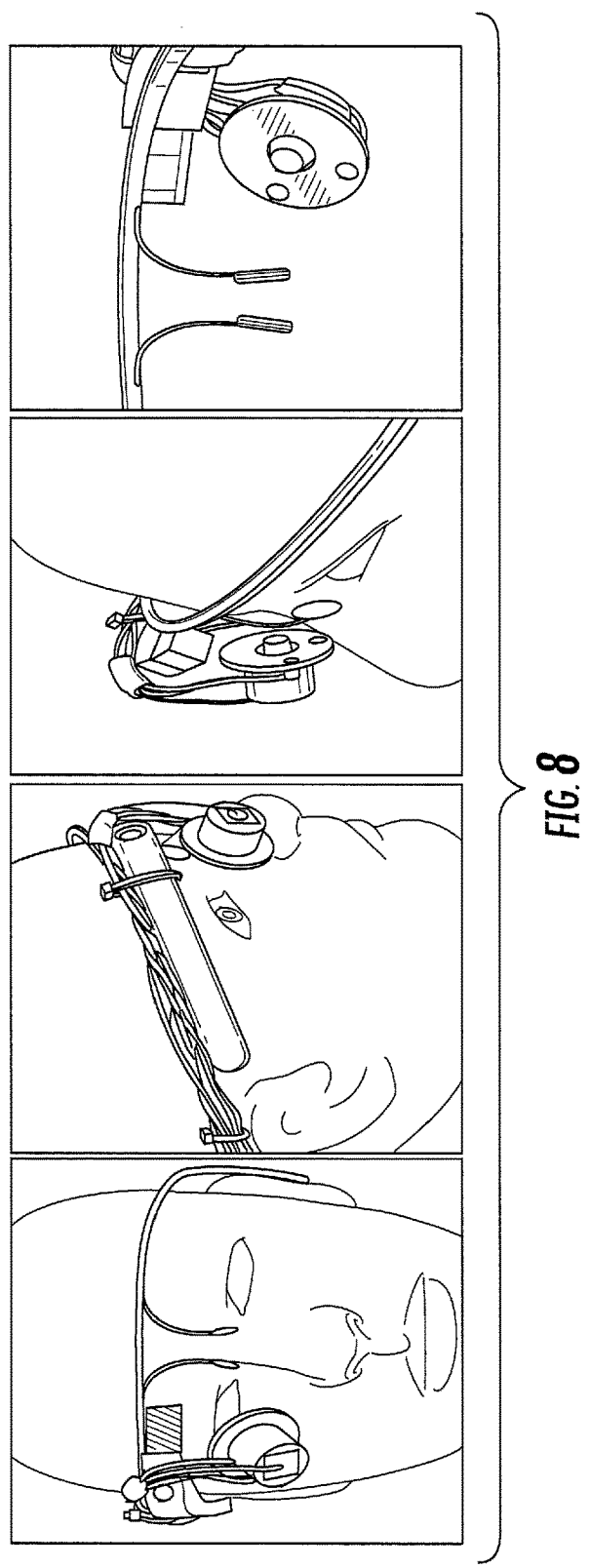
FIG. 8 illustrates a head worn display that comprises a Google Glass® display with eye tracking hardware according to an embodiment of the subject matter described herein. From left to right, the images in FIG. 8 are respectively 1) a front view of a head worn display with eye tracking hardware; 2) a right side view of a head worn display with eye tracking hardware; 3) a left side view of a head worn display with eye tracking hardware; and 4) a view of eye-tracking hardware from the viewpoint of the user. The camera (center of the hardware) can focus as close as one inch away, minimizing the light output required from LEDs to produce glints on the corneal surface.

See FIG. 8 for an example of one head-worn device configuration that we support. Our gaze detection system assumes that a user-facing camera is used to capture video of the user's eye. IR LED's are positioned beside the user-facing camera to illuminate the eye and produce a dark-pupil effect which helps differentiate the pupil from the iris [3]. A scene-facing camera faces the opposite direction of the user-facing camera and is used to image the user's environment synchronously with the user-facing camera These cameras are calibrated and views of these cameras do not overlap [4].

Our algorithm then estimates the user's gaze from each frame of the user's eye. Adaptive thresholding is performed on the frame in order to filter out the IR LED reflections (glints) and the pupil from the rest of the eye. We then find the Laplacian of the thresholded pupil, using the result to calculate the pupil's convex hull. An ellipse is fit to the convex hull in order to produce the final estimate of the pupil boundary. We empirically found that using the convex hull as input to an ellipse fitter ruggedizes the pupil extraction step of the pipeline. This approach produces accurate pupil estimates even if eyelashes, eyelids, or specular reflections slightly occlude the pupil. The center of the pupil ellipse corresponds to the eye image's pupil center. With the two glints and the projected pupil center found in the eye image, along with a coarse approximation of the physical parameters of the system, we can successfully estimate the user's gaze.

Once the gaze is found in the coordinate system of the user-facing camera, it is projected upon the scene-facing camera's image plane. Ideally, the projected gaze would pass through the pixels of the scene image corresponding to the user's point of regard (PoR). However, the projected gaze is likely to have errors for two reasons: 1) the user's eye parameters are initially unknown (initial estimates are used before the system is calibrated) and 2) the transformations between the eye and the device and the transformations between the two cameras are approximated initially. To remedy this, we can perform an automatic calibration using naturally occurring regions of interest found within the scene image; faces make for a good example since a large number of photographs have human subjects. We expect that the user naturally fixates upon salient regions of the scene for multiple frames, so we continuously calibrate the device such that the user's gaze projection pass through the nearest region of interest region by using a window of recent frames. This continuous calibration scheme accomodates changes in the eye-device transformation during device usage and supports users with different calibrations.

3 Related Work

Traditionally, gaze estimation techniques estimate a user's gaze in scenarios where they can move in front of a computer screen [3], [5], [6]. A significant portion of gaze estimation research is either focused upon improving human-computer interaction or on advancing assistive technology for the impaired [7], [8], [9], [10]. As wearable devices have become more ubiquitously feasible, gaze estimation has been explored for systems with see-through displays [11], [12] as well; however, these systems require a careful pre-calibration and rely upon a stable calibration throughout their use. For head-worn devices, the calibration typically changes during use as well as when the head-worn devices are taken off or put on. It is not practical to have the user actively perform a calibration procedure every time the head-worn device pose changes. In contrast to the existing state of the art approaches, our technique performs a continuous calibration of the device simply through observing the user's gaze and potential PoR's within the environment.

Hansen et al. [13] compare and contrast several different approaches, most of which estimate the user's PoR. The PoR techniques presented in their paper map a user's gaze onto a computer screen that is in a fixed relative pose with respect to the user [3]. On the contrary, our approach finds a PoR by relating the user's gaze to calibration areas of interest within the scene, breaking the requirement for known scene geometry.

Typically, the initial calibration required for accurate gaze tracking involves the user's active cooperation by looking at a number of calibration structures [14], [15]. Sugano et al. [16] achieve an error-corrected two-eye gaze estimate by showing natural images/videos to the user and leveraging saliency maps to determine what the user looked at. Their results show that combining saliency metrics, including face detection, allows for better modeling of the human visual system. Our method takes this concept further by using interest areas found within the real world as an indication of the user's gaze direction during a continuous calibration.

Tsukada et al. [17] present a system that is able to determine the user's PoR by extracting the gaze from a single eye leveraging an appearance code book for the gaze mapping. This appearance code book is very sensitive to the calibration, which is performed in a constrained environment and assumed to be constant throughout use. This assumption is not always given due to configuration and environment changes. In contrast our method does not require a global calibration and is continuously recalibrating the configuration of the user with respect to the head-worn device.

Nakazawa et al. [18] demonstrate a gaze estimation system which projects a coded light pattern upon the scene using a multispectral LED array. Martinez et al. [19] infer the gaze by relying upon appearance-based gaze estimation; they handle relative pose changes between the device and the user by estimating the eye-device transformation using a motion capture system within their testing environment. These techniques produce state-of-the-art results but rely upon specialized hardware which is not found in general environments.

Pirri et al. [20] propose a procedure for calibrating a scene-facing camera's pose with respect to the user's gaze [21]. While effective, the technique's dependance upon artificial markers in the scene prevents generalization. Santner et al. [22] built upon the research done by Pirri et al. by combining 3D saliency with a dense reconstruction of the user's environment for the purposes of user localization. Aside from requiring the gaze from both eyes, this system assumes a static environment which has been premapped by a Kinect sensor and is unable to handle dynamic scenes. In contrast, our proposed approach does not rely on a static scenes nor does it require known scene depths.

Alnajar et al. [23] stress the importance of automatic calibration in head-worn devices. They show that a user's cooperation with calibration schemes can simply be obtained through their everyday use of the device. While demonstrating incredibly high accuracy gaze estimation, their technique requires gaze information from two eyes as well as collaborating participants' gaze information in the same scene. In contrast, our proposed calibration only requires observation of a single eye from a single user, which broadens the range of possible environments.

Li et al. [24] propose a gaze estimation pipeline which utilizes first-person apperances of a user's hands to predict the user's fixation within the scene. While they achieve high accuracy, the pipeline requires gaze information from two eyes and does not generalize to videos which are devoid of users' hands.

4 Background

Next we will introduce the basic concepts used in our approach for automatic continuous calibration of head-worn devices.

4.1 Gullstrand Model of the Eye

The Gullstrand model is a simplified representation of the human eye. This model is used in the geometric model-based gaze estimation technique that we employ in our approach. We now introduce the Gullstrand model to the reader to help them better understand our gaze estimation and calibration techniques.

Figure 9:
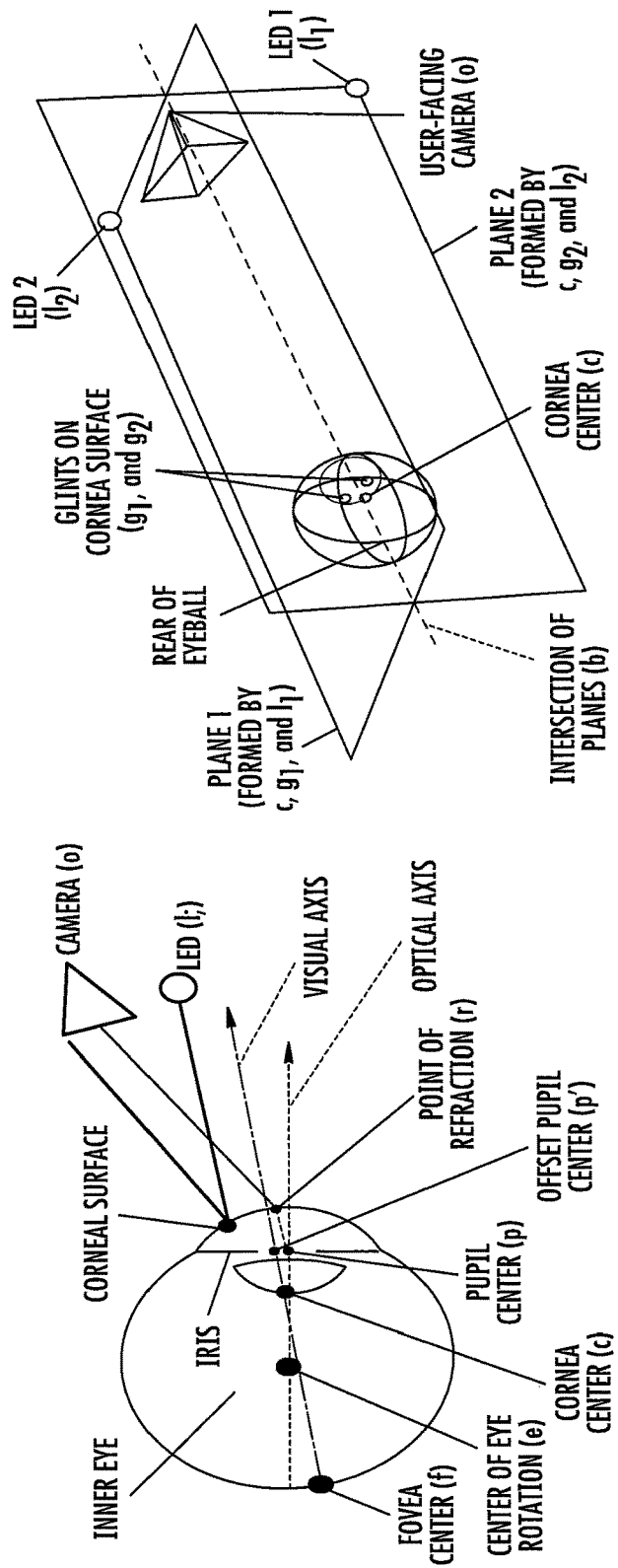
FIG. 9 (left) is a ray traced diagram illustrating a geometric based gaze estimation system for one light and one camera according to an embodiment of the subject matter described herein. The eye model depicted in FIG. 9 adheres to the Gullstrand model. The right hand diagram in FIG. 9 is a 3D diagram depicting how the corneal center can be found from two planes, each defined by one LED, the corresponding glint, and the user facing camera position.

A high-level illustration of the Gullstrand model is shown in FIG. 9. For analytical purposes, the exterior corneal surface can be approximated by a spherical convex mirror. Additionally, the dominant refraction of light entering the eye is due to the air-corneal surface boundary [3]. The Gullstrand model defines the eye's optical axis as the vector which begins at the center of the cornea and passes through the center of the pupil. However, a person's actual 3D PoR lies along their visual axis since the fovea is offset on the rear of the eye [3]. The visual axis is related to the optical axis by two predefined rotations about the eye's corneal center. For our purposes, the visual axis is simply the user's normalized gaze vector.

The Gullstrand model of the eye also provides some initial estimates of the eye's structure. The model says that the cornea has an average radius of $R_c=7.7$ mm and an average index of refraction of $\eta_1=1.3375$. The distance from the pupil to the center of the cornea is approximately $d_{r,c}=3.6$ mm, while the distance from the pupil to the corneal center is about $d_{p,c}=4.27$ mm. Note that these parameters are user-specific and need to be optimized for on a per-user basis.

4.2 Leveraging the Gullstrand Model of the Eye

Our gaze estimation method is inspired by Guestrin et al. [25]. We now outline our gaze estimation technique, the goal of which is to estimate a user's visual axis in the coordinate system of a user-facing camera. The following discussion outlines the mathematical formulation of the gaze estimation problem. In the following, we denote all 3D points in bold and lower case.

Consider a user-facing camera, o, which is positioned at the origin of the system. Additionally, consider a number of light sources, $I_j$, that are coplanar with the camera. Each light source $I_j$ produces a reflection, $g_j$, on the user's corneal surface known as a glint. Each glint intersects the user facing camera (UFC) image plane at a distinct point, $u_j$. The relationships between each of these points is presented in FIG. 9. If the corneal center, c, has radius $R_c$ then each glint $g_j$ satisfies $\|g_j-c\|=R_c$.

Guestrin et al. [25] derive, through the law of reflection, two additional constraints which are presented in Equations (1) and (2).

$$(l_j-g_j)\cdot(g_j-c)\cdot\|o-g_j\|=(o-g_j)\cdot(g_j-c)\cdot\|l_j-g_j\| \quad (1)$$

$$(l_j-o)\times(g_j-o)\cdot(c-o)=0 \quad (2)$$

Equation (2) reveals that the corneal center is a point which lies on all planes defined by the camera, an LED, and that LED's glint. For a two LED system, this implies that the corneal center lies on a line, b, defined by the intersection of the two distinct planes. Refer to FIG. 9 for an illustration of the intersecting planes. The corneal center c can be found by moving a distance of $d_{c,e}+R_c$ from the user-facing camera towards the user's eye (where $d_{c,g}$ is the distance from the user-facing camera to the corneal surface).

With the corneal center found, our task becomes finding the pupil center, p. Using Snell's law, we can derive a constraint which allows us to solve for the pupil center from the positions of the user-facing camera and the glints $u_j$ provided that we first find the point of refraction on the air-cornea boundary, r:

$$\eta_1\cdot\|(r-c)\times(p-r)\|\cdot\|o-r\|=\|(r-c)\times(o-r)\|\cdot\|p-r\| \quad (3)$$

Solving Equation (3) for the pupil center will allow us to find the user's optical axis and, subsequently, to compute visual axis. We approach this solution by temporarily changing the coordinate system to that shown in FIG. 10 and solving for the pupil center with a sampling-based approach. This is opposed to the convention made by Guestrin et al. [25], who place the eye's center of rotation, e, as the center of the new coordinate system. Placing the corneal center at the origin of the system reduces the total number of coordinate system changes and provides a more convenient way to calculate the visual axis. The optical axis is associated with some angles $\theta$ and $\phi$. The Gullstrand model of the eye dictates that the visual axis is approximately ±5degrees to the side of the optical axis of the eye (call this angle $\alpha$), and about ±1.5 degrees above it (call this angle β). The equation for calculating the values of θ and φ is derived from FIG. 10 and is given by Equation (4).

$$\frac{p-c}{\|p-c\|} = \begin{bmatrix} \cos(\phi)\sin(\theta) \\ \sin(\phi) \\ -\cos(\phi)\cos(\theta) \end{bmatrix} \quad (4)$$

Figure 10:
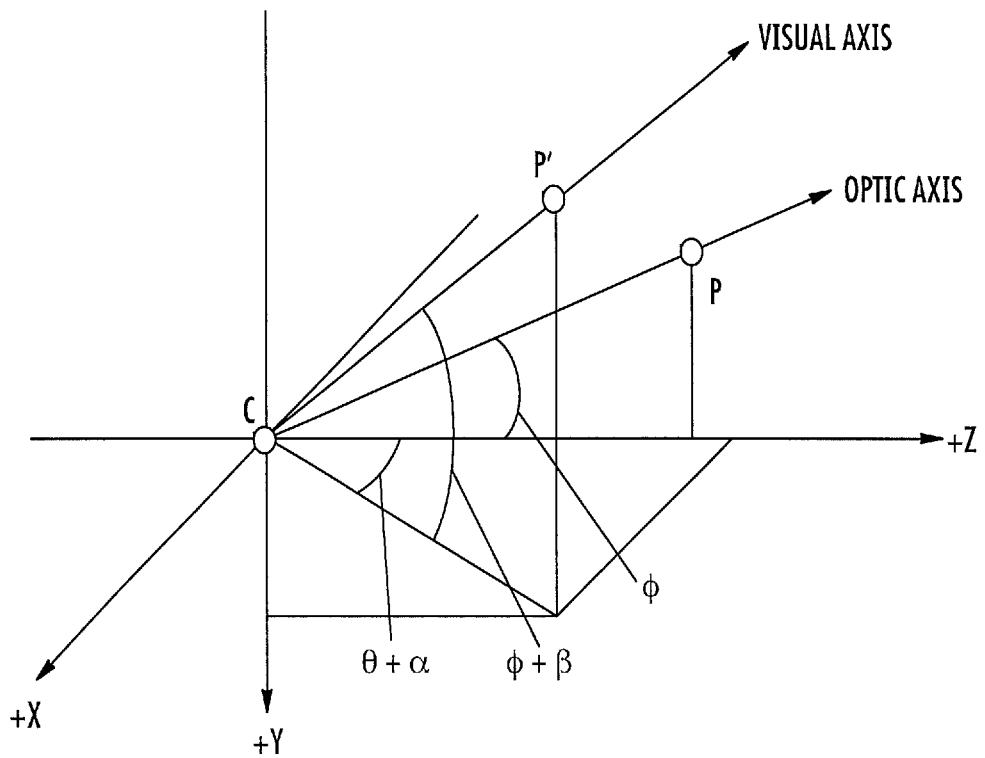
FIG. 10 is a graph illustrating the coordinate system used for calculation of the visual axis according to an embodiment of the subject matter described herein.

The visual axis can be found by offsetting the pupil center, p, to a nearby, adjusted pupil center, p'. FIG. 10 depicts this offset. The adjusted pupil center is picked to be a distance of $d_{c,p}$ from the corneal center and must lie on the line passing through the corneal center, c, and the center of the fovea, f. Guestrin et al. [25] present a method for calculating the offset pupil center p' using the user-specific angles α and β. Finding the ray which originates at the corneal center and passes through the adjusted pupil center yields the visual axis. This is the ray which is projected upon the scene-camera's image plane when determining the user's 3D PoR.

5 Establishing a Locally Optimal Eye-Device Calibration

There are several unknowns within our system because we aim to accommodate changes in the eye-device transformation during usage. In order to address this, we use a continuous calibration scheme over the Gullstrand model's user-specific parameters as well as the degrees of freedom present in the head-worn device. We expect that users will unconsciously fixate upon the same interesting regions of their environment for multiple frames, so we empirically observe that the eye-device transformation will remain relatively consistent for short durations of time. To leverage this observation, we optimize over a small window of recent frames and apply these locally optimal parameters to our system for a short duration of time. To accomplish this, we project the user's visual axis onto the image of the scene using an estimate of the current eye-device transformation. Then, by correcting each frame's gaze to the image's nearest calibration area of interest, we can find an eye-device transformation that is optimal for all frames within the specified window. This transformation can then be used to correct errors in multiple frames which occur immediately after the calibration window. At high frequencies, these calibration updates reduce the gaze projection error even as the eye-device relationship changes during use.

The following sections describe this problem in more detail. After formally defining the calibration task, we outline our approach and various challenges that we faced.

5.1 Problem Description

In order to be useful, the user's estimated gaze must be accurately related to candidate PoR's within the scene. Because head-worn devices tend to move about a user's face during typical use, a calibration scheme is desirable. To accomplish this, it must be capable of accurately estimating an optimal parametric model of the eye-device relationship at any time, t. We define model optimality to mean that, when projected upon the scene-facing camera's image plane, the Euclidian distance between the visual axis and the nearest calibration area of interest in the image plane is minimized at time t.

Recall that the Gullstrand model of the eye provides six main parameters to optimize over: the corneal radius, $R_c$, the eye's index of refraction, $\eta_1$, the distance from the pupil center to the corneal center of the cornea, $d_{c,p}$, the distance between the eye and the user-facing camera, $d_{c,o}$, and the two angular offsets used to find the visual axis from the optic axis: α and β. Refer to FIG. 9 and FIG. 10 for the relationships between each of these parameters. In addition, the head-worn device has six degrees of freedom itself: three dimensions of translation (x, y, and z), and three dimensions of rotation (φ, θ, and ψ). Hence, the parameters of an eye-device model at a time t can be described by $P_t = <x, y, z, \phi, \theta, \psi, d_{c,g}, R_c, d_{c,p}, \eta_1, \alpha, \beta>$

5.2 Approach

The eye-device relationship at time t, described by the parametric model $P_t$, allows for direct calibration between the user's eye and the scene-facing camera without having to know the exact extrinsic relationship between the user- and scene-facing cameras. Our technique only requires the cameras to be intrinsically calibrated; the only a priori knowledge that is required about the cameras' extrinsic relationship is an approximate estimate of their transformation. Ordinarily, this extrinsic relationship could be found through mirror-based calibration techniques for cameras with non-overlapping views (for example, the algorithm proposed by Kuman et al. [4]). However, because our calibration scheme directly relates the visual axis with points on the scene-camera's image plane, accurate extrinsic camera calibration is unnecessary.

Because we are operating a head-worn device with gaze detection, we assume that we have a real-time video of the user's eye, U, and a real-time video of the scene, S, which are synchronized. The user's projected visual axis, $v_j$, is found by parsing the visual axis from $j^{th}$ frame of U using the method described in Section 4.2 and projecting it upon the scene-facing camera's image plane. Regions of interest are found for the $j^{th}$ frame of S, and the interest region nearest to the projected visual axis is selected as the calibration interest area, $s_j$, . These potential calibration interest areas can be obtained by methods such as saliency analysis or face detection.

The euclidian distance between the projected visual axis and the nearest calibration interest area can be described by a number of parametric models. However, a user's fixation upon a region of the scene causes the user's visual axis to have frame-to-frame spatiotemporal constraints. Thus, by weighing the other models in the window, we can disambiguate the locally optimal solution. This locally optimal parametric solution, $P_t$, is then accurate for the current eye-device model at time t and for small perturbations about that model (i.e. temporally nearby frames).

In order to optimize the eye-device calibration, and to ensure that our calibration remains causal, we must minimize the euclidian distance between the projected visual axis, $v_j$, , and the calibration interest area, $S_j$, for all frames within a window of frames immediately preceding time t. Each euclidian distance, $d(v_j, s_j)$ within the k frame window is used to form a vector of costs, C. This allows us to formulate the calibration for example as a nonlinear least squares optimization problem as follows:

$$C = \begin{bmatrix} d(v_{t-1}, s_{t-1}) \\ d(v_{t-2}, s_{t-2}) \\ d(v_{t-3}, s_{t-3}) \\ \ldots \\ d(v_{t-k}, s_{t-k}) \end{bmatrix} \quad (5)$$

$$\underset{P_t}{\text{minimize}} C(P_t) = \sum_{j=1}^{k} C_j(P_t)^2 \quad (6)$$

Any other suitable distance metrics can also be used instead of the squared distance in Equation (6). We note that depending on the particular solver used to obtain a solution of Equation 6 or the solution using a different distance metric, it may be required to chose k such that a sufficient number of constraints is guaranteed in order to obtain a unique solution. Simultaneously optimizing over all of the models in the window yields an estimate of the locally optimal parametric model, $P_t$, at time t. Calibration accuracy is maximized when all costs in the calibration window can be minimized by a single parametric model. As such, we choose a short calibration window to ensure that only similar eye-device transformations are being analyzed in a single calibration. If too many frames are included within the calibration window, the optimization will begin approaching a single, globally optimal eye-device model instead of a locally optimal one; this will lower the quality of the model's approximation.

5.3 Finding Calibration Interest Areas within a Scene

In order to make our system functional outside of controlled environments, we can not rely upon markers placed throughout the user's environment for calibration. Hence, our system must find naturally existing markers in the environment so that it can automatically calibrate itself using gaze data collected during normal operation of the device. This yields all the benefits of a calibrated system while never interrupting or inconveniencing the user with manual device calibration.

We propose the use of salient regions within a scene—regions that we expect to be distinctive and stable during the calibration process—to serve as calibration interest areas. Our system does not have knowledge of the 3D geometry of the user's scene so it relies upon a 2D saliency map of the scene in order to pick out these calibration interest areas. Salient regions can be found by multiple means. For example, face detection can be used in conjunction with detection of large illumination, contrast, and color gradients to emulate the human visual system [16].

Given a video stream of the scene facing camera, F, the saliency map, $M_j$, can be found for frame $F_j$ [16]. We then threshold $M_k$ to find the most salient blobs of pixels for that frame. To determine which of those salient regions are stable and repeatable we can search for them locally in the set of scene calibration input frames $F_{scene}=\{F_{j-1}, F_{j-2}, \ldots, F_{j-k}\}$, where k is a tunable parameter of the system. The centroids for those regions which have been found in all elements of F are picked as calibration interest areas for the given scene.

5.4 Challenges

Successful system operation hinges upon the accuracy of the nonlinear optimization's cost function. Excessive occlusions of the pupil or high-frequency motion of the head-worn device can make it difficult to accurately detect the corneal and pupil centers. These events introduce nontrivial error into the estimates of the user's gaze, consequently affecting the accuracy of our calibration. However, these events can be easily identified. Frames with excessive pupil occlusion can be identified by training an SVM on the appearance of unoccluded eyes. High-frequency head motions can be detected by analyzing inertial data from the head-worn device and disallowing calibration during times of large motion uncertainties. We leave the detection of these degenerate cases as future work.

It is possible that the speed or magnitude of a user's eye motion breaks the spatiotemporal constraints that we place on it (for example, if we try and calibrate when the user breaks their fixation on a particular region of the scene). Calibrating over a window of frames which includes such an event can cause the estimated locally optimal model to not generalize to future frames. Fortunately, we can detect these circumstances by applying the locally optimal model to the frames within the calibration window and re-evaluating the cost for each frame. If these costs are above an acceptable threshold then the locally optimal model is not a good fit for the frames in the window; this is an indication that the model will likely be a poor fit for future frames, too.

6 Experimental Results

The primary goal of our experiments is to evaluate the accuracy of our high-frequency calibration system. Instead of relying upon a visual saliency method like Graph-based Visual Saliency (GBVS), we opt for face detection to produce our salient regions. Previous work by Sugano et al. [16] shows that face detection plays a significant role in creating gaze probability maps which emulate the human visual system. Hence, in the spirit of Sugano et, al. [16], calibration interest points will be picked as the center of any face identified within the user's scene. We expect the system to generalize well towards more complex saliency detection methods like the gaze probability maps produced by Sugano et al. [16] but leave this as future work.

In all of the following experiments, the head-worn device's calibration was initialized with the default Gullstrand eye parameters and pose parameters which directly align the user-facing camera with the user's right eye. We use this generic setup to show that our system can adapt to any feasible head-device relationship. The device is loosely attached to the user's head to allow natural movement during use. We use a value of k=5 for calibration; that is, we pick a window size of 5 frames for our continuous calibration. All experimental setups have a known distance between the user and the calibration point. This distance is unknown to the system and is only used for post-calibration gaze error calculations.

After finding the locally optimal model for time t over the window of frames at t–1 to t–5, we analyze their accuracies. Results for each experiment are presented graphically in FIGS. 11 and 12 with three criteria plotted: 1) the reprojection error from applying the locally optimal model to the window that produced it (calibration error), 2) the error produced at time t when applying the locally optimal model (next-frame error), and 3) the mean error produced when the locally optimal model is applied to the next five future frames of the calibration.

To benchmark our results, we note that Pfeuffer et al. [26] achieve gaze estimation errors as low as 0.55 degrees by estimating the visual axis with 4 glints and having the user initially participate in active calibration. Guestrin et al. [25] achieve an average gaze error of 0.9 degrees with one calibration point. Recent works such as Alnajar et al. [23] have produced calibration-free gaze estimation systems, but their errors are on the order of degrees and can't yet compete with techniques which have calibration procedures. Other, older calibration techniques such as Tan et al. [27] manage to report gaze estimation errors as low as 0.38 degrees but require over 250 calibration points; the number of calibration points that we use is dependent upon the selected window size (one calibration point per frame in the window).

6.1 Effects of Head Motion on Calibration

To estimate the system's performance in practical scenes, our first experiment had the user fixate upon a person's face while rotating their head. In this dataset, the device was placed approximately 30 degrees above the user's right eye and approximately 10 degrees towards the user's right ear. The device was positioned to allow the user-camera to view the user's right eye. We allowed for natural movement of the device during operation. A subject sat 1.75 meters away from the user and the user maintained fixation upon the subject's face as they rotated their head. Synchronized video was captured from the user-facing and scene-facing cameras. The user-facing camera's output was subject to gaze estimation, while the scene-facing camera's output was subject to saliency analysis. Note that the device's elevation above the user's eye causes slight eyelash occlusion of the pupil. A majority of this occlusion is handled by our convex hull and ellipse fitting approach to pupil estimation, although more severe pupil occlusions can occasionally cause error spikes.

Figure 11:
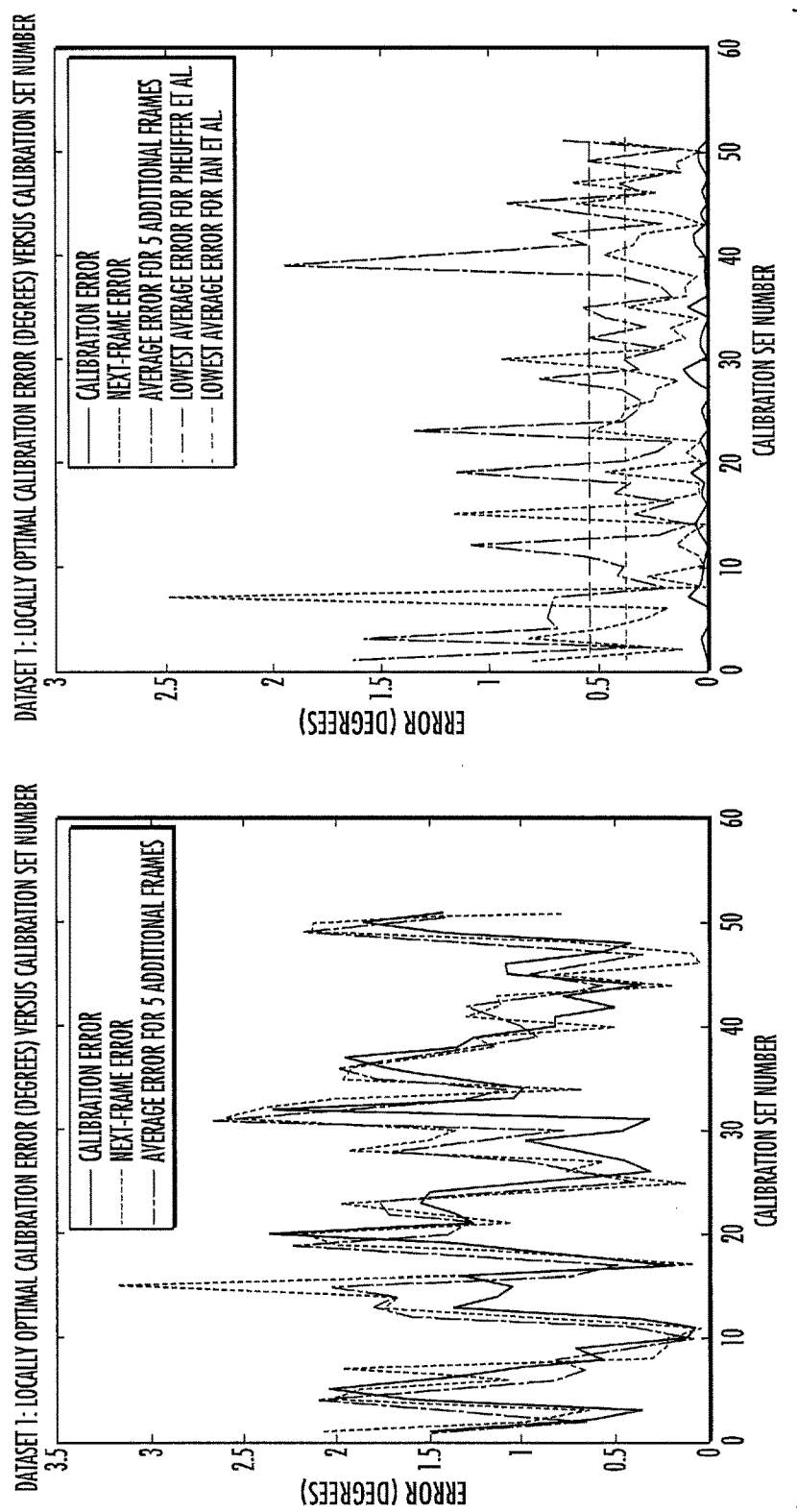
FIG. 11 (left) is a graph of gaze estimation error using static calibration.

FIG. 11 depicts the error plots for experiment 1. Table 1 shows how our results compare to competing gaze calibration systems. The maximum error for this dataset was due to large pupil occlusions and IR lighting inconsistencies caused by eyelashes and device movement during use. The results from FIG. 11 show that our continuous calibration scheme significantly outperforms an approximate global calibration scheme (setting the calibration window size to be very high). These results were consistent across multiple users. Intuitively, this result implies that frequent recalculation of the eye-device calibration allows for a tighter fit to changes in the eye-device model over time.

TABLE 1

Experiment 1 Results

| | Our Approach | [26] | [27] | [25] |
|---|---|---|---|---|
| Mean Error (degrees) | 0.18 | 0.55 | 0.38 | 0.9 |
| Calibration Points | 5 | 600 | 250 | 1 |

6.2 Effects of Device Repositioning on Calibration

Figure 12:
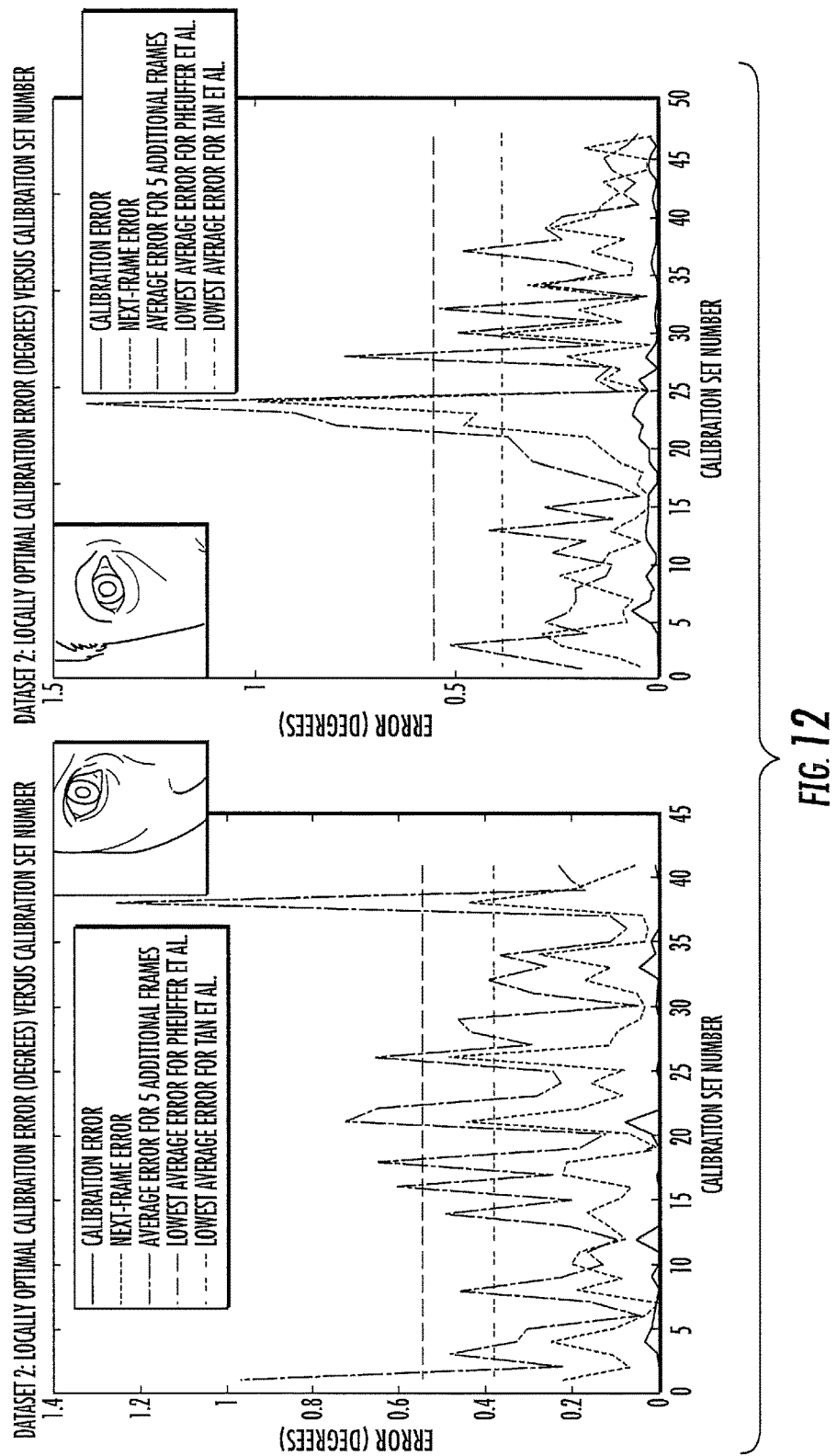
FIG. 12 (left) is a diagram illustrating an error plot for experiment two's frame sequence and a sample based user image from a second data set.

In our second and third experiments, we placed the head-worn device in different positions around the user's face. In the second experiment, the head-worn device was positioned such that the user-facing camera was approximately 20degrees above the user's right eye. The device was above the user's right eye and was angled downwards to observe the eye. In the third experiment, the head-worn device was positioned below the user's right eye. It was approximately 25 degrees below the user's right eye, this time angled upwards to observe the user's eye. In both cases, the target salient region was positioned 1.05 meters away from the user and the device was allowed to move naturally with the user. Once again, synchronized video was captured from the user-facing and scene-facing cameras, FIG. 12 shows the results of experiments 2 and 3. Table 2 shows how our system maintains high calibration accuracy despite the head-worn device starting in an unknown pose. The results in FIG. 12 show that our technique provides a highly accurate calibration despite the device being worn in an initially unknown (and uncalibrated) pose.

TABLE 2

Experiment 2 and 3 Results

| | | Our Approach | [26] | [27] | [25] |
|---|---|---|---|---|---|
| Experiment 2 | Mean Error (degrees) | 0.14 | 0.55 | 0.38 | 0.9 |
| | Calibration Points | 5 | 600 | 250 | 1 |

TABLE 2-continued

Experiment 2 and 3 Results

| | | Our Approach | [26] | [27] | [25] |
|---|---|---|---|---|---|
| Experiment 3 | Mean Error (degrees) | 0.17 | 0.55 | 0.38 | 0.9 |
| | Calibration Points | 5 | 600 | 250 | 1 |

7 CONCLUSION

Gaze estimation techniques provide a plethora of new possibilities and are becoming increasingly popular as a way of providing additional input to consumer-grade electronic systems. We believe that head-worn devices will be the next battleground for improving user interaction. The subject matter described herein includes a novel, continuous, automatic calibration scheme which operates upon locally optimal models of the eye-device relationship at any given time. Calibration can be performed in a large number of unconstrained environments since our system relies upon naturally existing salient regions instead of traditional calibration markers. Our experiments showed that our system produces highly-accurate estimates of the user's gaze with respect to the user's scene, allowing for a head-worn device to update its calibration if the device-eye pose changes over time. Our results showed that a continuous calibration scheme can outperform state of the art static calibration schemes while automatically adapting to variations in eye-device pose.

The disclosure of each of the following references is hereby incorporated herein by reference in its entirety.

REFERENCES

[1] Park, H. S., Jain, E., Sheikh, Y.: 3d social saliency from head-mounted cameras. In: NIPS. (2012) 431-439
[2] Jain, E., Sheikh, Y., Hodgins, J.: Inferring artistic intention in comic art through viewer gaze. In: ACM Symposium on Applied Perception (SAP)
[3] Morimoto, C., Amir, A., Flickner, M.: Detecting eye position and gaze from a single camera and 2 light sources. In: Pattern Recognition, 2002. Proceedings. 16th International Conference on. Volume 4. (2002) 314-317 vol. 4
[4] Kumar, R., Hie, A., Frahm, J. M., Pollefeys, M.: Simple calibration of non-overlapping cameras with a mirror. In: Computer Vision and Pattern Recognition, 2008. CVPR 2008. IEEE Conference on. (June 2008) 1-7
[5] Wang, J., Sung, E., Venkateswarlu, R.: Eye gaze estimation from a single image of one eye. In: Computer Vision, 2003. Proceedings. Ninth IEEE International Conference on. (October 2003) 136-143 vol. 1
[6] Meyer, A., Böhme, M., Martinetz, T., Barth, E.: A single-camera remote eye tracker. In: Proceedings of the 2006 International Tutorial and Research Conference on Perception and Interactive Technologies. PIT'06, Berlin, Heidelberg, Springer-Verlag (2006) 208-211
[7] Twardon, L., Koesling, H., Finke, A., Ritter, H.: Gaze-contingent audio-visual substitution for the blind and visually impaired. In: Pervasive Computing Technologies for Healthcare (PervasiveHealth), 2013 7th International Conference on. (May 2013) 129-136
[8] Lahiri, U., Warren, Z., Sarkar, N.: Design of a gaze-sensitive virtual social interactive system for children with autism. Neural Systems and Rehabilitation Engineering, IEEE Transactions on 19(4) (August 2011) 443-452

[9] Corno, F., Farinetti, L., Signorile, I.: A cost-effective solution for eye-gaze assistive technology. Multimedia and Expo, 2002. ICME '02. Proceedings. 2002 IEEE International Conference on 2 (2002) 433-436 vol. 2

[10] Lahiri, U., Warren, Z., Sarkar, N.: Dynamic gaze measurement with adaptive response technology in virtual reality based social communication for autism. Virtual Rehabilitation (ICVR), 2011 International Conference on (June 2011) 1-8

[11] Toyama, T., Dengel, A., Suzuki, W., Kise, K.: Wearable reading assist system: Augmented reality document combining document retrieval and eye tracking. In: Document Analysis and Recognition (ICDAR), 2013 12th International Conference on. (August 2013) 30-34

[12] Park, H. M., Lee, S. H., Choi, J. S.: Wearable augmented reality system using gaze interaction. In: Mixed and Augmented Reality, 2008. ISMAR 2008. 7th IEEE/ACM International Symposium on. (September 2008) 175-176

[13] Hansen, D., Ji, Q.: In the eye of the beholder: A survey of models for eyes and gaze. Pattern Analysis and Machine Intelligence, IEEE Transactions on 32(3) (March 2010) 478-500

[14] Villanueva, A., Cabeza, R.: A novel gaze estimation system with one calibration point. Systems, Man, and Cybernetics, Part B: Cybernetics, IEEE Transactions on 38(4) (August 2008) 1123-1138

[15] Nakazawa, A., Nitschke, C.: Point of gaze estimation through corneal surface reflection in an active illumination environment. In Fitzgibbon, A., Lazebnik, S., Perona, P., Sato, Y., Schmid, C., eds.: Computer Vision ECCV 2012. Lecture Notes in Computer Science. Springer Berlin Heidelberg (2012) 159-172

[16] Sugano, Y., Matsushita, Y., Sato, Y.: Appearance-based gaze estimation using visual saliency. IEEE Transactions on Pattern Analysis and Machine Intelligence 35(2) (2013) 329-341

[17] Tsukada, A., Shino, M., Devyver, M., Kanade, T.: Illumination-free gaze estimation method for first-person vision wearable device. In: Computer Vision Workshops (ICCV Workshops), 2011 IEEE International Conference on. (November 2011) 2084-2091

[18] Nakazawa, A., Nitschke, C.: Point of gaze estimation through corneal surface reflection in an active illumination environment. In Fitzgibbon, A., Lazebnik, S., Perona, P., Sato, Y., Schmid, C., eds.: Computer Vision ECCV 2012. Lecture Notes in Computer Science. Springer Berlin Heidelberg (2012) 159-172

[19] Martinez, F., Carbone, A., Pissaloux, E.: Combining first-person and third-person gaze for attention recognition. In: Automatic Face and Gesture Recognition (FG), 2013 10th IEEE International Conference and Workshops on. (April 2013) 1-6

[20] Pirri, F., Pizzoli, M., Rigato, D., Shabani, R.: 3d saliency maps. In: Computer Vision and Pattern Recognition Workshops (CVPRW), 2011 IEEE Computer Society Conference on. (June 2011) 9-14

[21] Pirri, F., Pizzoli, M., Rudi, A.: A general method for the point of regard estimation in 3d space. In: Computer Vision and Pattern Recognition (CVPR), 2011 IEEE Conference on. (June 2011) 921-928

[22] Santner, K., Fritz, G., Paletta, L., Mayer, H.: Visual recovery of saliency maps from human attention in 3d environments. In: Robotics and Automation (ICRA), 2013 IEEE International Conference on, (May 2013) 4297-4303

[23] Alnajar, F., Gevers, T., Valenti, R., Ghebreab, S.: Calibration-free gaze estimation using human gaze patterns. In: 15th IEEE International Conference on Computer Vision. (2013)

[24] Li, Y., Fathi, A., Rehg, J. M.: Learning to predict gaze in egocentric video. In: International Conference on Computer Vision, ICCV 2013. (2013)

[25] Guestrin, E., Eizenman, E.: General theory of remote gaze estimation using the pupil center and corneal reflections. Biomedical Engineering, IEEE Transactions on 53(6) (June 2006) 1124-1133

[26] Pfeuffer, K., Vidal, M., Turner, J., Bulling, A., Gellersen, H.: Pursuit calibration: Making gaze calibration less tedious and more flexible. In: Proceedings of the 26th Annual ACM Symposium on User Interface Software and Technology. UIST '13, New York, N.Y., USA, ACM (2013) 261-270

[27] Tan, K. H., Kriegman, D., Ahuja, N.: Appearance-based eye gaze estimation. In: Applications of Computer Vision, 2002. (WACV 2002). Proceedings. Sixth IEEE Workshop on. (2002) 191-195

What is claimed is:

1. A system for leveraging user gaze in a user monitoring subregion selection system, the system comprising:
a first camera configured to capture an image of a scene;
a sensor configured to obtain an image reflected from one of the user's eyes;
a gaze estimation and scene mapping module configured to estimate a gaze direction of the user using the image captured by the sensor and to map the estimated gaze direction to the image of the scene based on a location of an object of interest within the scene, wherein the gaze estimation and scene mapping module is configured to estimate the gaze direction by identifying, as a visual axis, a ray that originates at a corneal center of the eye and passes through an adjusted pupil center of the eye, and to map the estimated gaze direction to the image of the scene by projecting the ray into an image plane of the first camera to determine a three dimensional point of regard (PoR) of the user; and
a scene subregion selection module configured to select a subregion of the image of the scene based on the mapped user gaze direction.

2. The system of claim 1 comprising an image capture activation module configured to initiate image capture by the first camera in response to a command or gesture from the user.

3. The method of claim 2 wherein the image capture activation module invokes framing of the image of the scene, obtaining of the image, estimation of the gaze direction, selection of the subregion, and the image capture by the first camera in response to a single command or gesture of the user.

4. The system of claim 1 comprising a pattern generator for generating and projecting a pattern onto the user's eye and wherein the image detected by the sensor comprises an image of the pattern reflected from the user's eye.

5. The system of claim 4 wherein the pattern generator comprises a plurality of light emitting diodes (LEDs) spaced from each other to generate and project the pattern, wherein the sensor comprises a second camera for capturing the image of the pattern reflected from the eye of the user, and wherein the gaze estimation and scene mapping module is configured to estimate the gaze direction of the user based on the reflected image.

6. The system of claim 1 wherein the sensor comprises a stereo user facing camera, and wherein the gaze estimation and scene mapping module is configured to estimate the gaze direction without using a pattern projected by a pattern generator.

7. The system of claim 4 wherein the pattern generator comprises a display for displaying and projecting the pattern, wherein the sensor comprises a second camera for detecting the pattern reflected from the eye of the user, and wherein the gaze estimation and scene mapping module is configured to estimate the gaze direction of the user based on the reflected image.

8. The system of claim 1 comprising a scene saliency identification module configured to, based on the estimated gaze direction, identify a portion of the scene at which the user is gazing and predict a current activity of the user.

9. The system of claim 1 wherein the gaze estimation and scene mapping module is configured to estimate the gaze direction of one of the user's eyes.

10. The system of claim 1 wherein the gaze estimation and scene mapping module is configured to estimate the gaze direction of both of the user's eyes.

11. The system of claim 1 wherein the sensor comprises a single camera configured to obtain the image reflected from the eye.

12. The system of claim 1 comprising a housing, wherein the first camera, the sensor, the gaze estimation and scene mapping module, and the scene subregion selection module are located within the housing.

13. The system of claim 12 wherein the housing is configured to be held in at least one of a user's hands.

14. The system of claim 12 comprising a mechanism for mounting the housing to the user's head.

15. The system of claim 1 wherein the first camera comprises a user facing camera of a mobile phone and the sensor comprises a scene facing camera of the mobile phone.

16. The system of claim 1 wherein the first camera comprises a scene facing camera of a mobile phone and the sensor comprises a user facing camera of the mobile phone.

17. The system of claim 1 wherein the gaze estimation and scene mapping module is configured to continually calibrate the mapping between the user gaze direction and the image of the scene.

18. The system of claim 17 wherein the gaze estimation and scene mapping module is configured to perform the continual calibration based on locations of the object of interest in a moving window of images of the scene.

19. A method for leveraging user gaze in a user monitoring subregion selection system, the method comprising:
capturing an image of a scene using a first camera;
detecting, using a sensor, an image reflected from one of the user's eyes;
estimating a gaze direction of the user using the image captured by the sensor, wherein estimating the gaze direction includes identifying, as a visual axis, a ray that originates at a corneal center of the eye and passes through an adjusted pupil center of the eye;
mapping the estimated gaze direction to the image of the scene based on a location of an object of interest within the scene, wherein mapping the gaze direction to the image of the scene includes projecting the ray into an image plane of the first camera to determine a three dimensional point of regard (PoR) of the user; and
selecting a subregion of the image of the scene based on the mapped user gaze direction.

20. The method of claim 19 comprising initiating image capture by the first camera in response to a command or gesture from the user.

21. The method of claim 20 comprising initiating the framing of the image, the obtaining of the image, the estimating of the gaze direction, the selection of the subregion, and the image capture in response to a single command or gesture of the user.

22. The method of claim 19 comprising generating and projecting a pattern onto the user's eye and wherein the image detected by the sensor comprises an image of the pattern reflected from the user's eye.

23. The method of claim 22 wherein generating and projecting the pattern includes utilizing a plurality of light emitting diodes (LEDs) spaced from each other, wherein obtaining the image of the pattern includes utilizing a second camera, and wherein estimating the gaze direction includes utilizing the image detected by the second camera.

24. The method of claim 22 wherein generating and projecting the pattern includes utilizing a display, wherein obtaining the image of the pattern includes utilizing a second camera, and wherein estimating the gaze direction includes utilizing the image detected by the second camera.

25. The method of claim 19 comprising identifying, based on the estimated gaze direction, a portion of the scene at which the user is gazing and predict a current activity of the user.

26. The method of claim 19 wherein estimating the gaze direction includes estimating the gaze direction of one of the user's eyes.

27. The method of claim 19 wherein estimating the gaze direction includes estimating the gaze direction of both of the user's eyes.

28. The method of claim 22 wherein obtaining the image of the pattern reflected from the user's eye comprises utilizing a single camera to obtain the image of the pattern reflected from one of the user's eyes.

29. The method of claim 22 wherein obtaining the image of the pattern reflected from the at least one of the user's eyes comprises utilizing two cameras to obtain the image of the pattern reflected from one of the user's eyes from different viewpoints.

30. The method of claim 29 wherein the framing, generating obtaining, estimating, and subregion selecting are performed using components within the same housing.

31. The method of claim 30 wherein the housing is configured to be held in at least one of a user's hands.

32. The method of claim 30 wherein the housing is configured to be mounted to or on the user's head.

33. The method of claim 19 wherein framing the image of the scene comprises utilizing a user facing camera of a mobile phone and wherein obtaining the image of the pattern comprises utilizing a scene facing camera of the mobile phone.

34. The method of claim 19 wherein framing the image of the scene comprises utilizing a scene facing camera of a mobile phone and wherein obtaining the image reflected from the user's eye comprises utilizing a user facing camera of the mobile phone.

35. The method of claim 19 wherein mapping the gaze direction to the image of the scene comprises continually calibrating the mapping between the user gaze direction and the image of the scene.

36. The method of claim 35 wherein continually calibrating the mapping includes performing the continuous calibration based on locations of the object of interest in a moving window of images of the scene.

37. A non-transitory computer readable medium having stored thereon executable instructions that when executed by the processor of a computer control the computer to perform steps comprising:
- capturing an image of a scene using a first camera;
- detecting, using a sensor, an image reflected from one of the user's eyes;
- estimating a gaze direction of the user using the image captured by the sensor, wherein estimating the gaze direction includes identifying, as a visual axis, a ray that originates at a corneal center of the eye and passes through an adjusted pupil center of the eye;
- mapping the estimated gaze direction to the image of the scene based on a location of an object of interest within the scene, wherein mapping the gaze direction to the image of the scene includes projecting the ray into an image plane of the first camera to determine a three dimensional point of regard (PoR) of the user; and
- selecting a subregion of the image of the scene based on the mapped user gaze direction.

* * * * *